US012421789B2

(12) United States Patent
Brush et al.

(10) Patent No.: US 12,421,789 B2
(45) Date of Patent: Sep. 23, 2025

(54) PET DOOR

(71) Applicant: Radio Systems Corporation, Knoxville, TN (US)

(72) Inventors: Marc Brush, Knoxville, TN (US); Cody Stricklin, Knoxville, TN (US); Jason Graves, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 146 days.

(21) Appl. No.: 18/223,840

(22) Filed: Jul. 19, 2023

(65) Prior Publication Data

US 2023/0358094 A1 Nov. 9, 2023

Related U.S. Application Data

(63) Continuation-in-part of application No. 17/901,959, filed on Sep. 2, 2022, now Pat. No. 11,983,978.

(60) Provisional application No. 63/240,161, filed on Sep. 2, 2021.

(51) Int. Cl.
*E06B 7/20* (2006.01)
*E06B 7/32* (2006.01)

(52) U.S. Cl.
CPC . *E06B 7/20* (2013.01); *E06B 7/32* (2013.01)

(58) Field of Classification Search
CPC .. G07C 9/28; G07C 9/00309; G07C 9/00738; G07C 9/00896; G07C 9/22; G07C 2009/00769; G07C 9/20; G07C 2009/00373; G07C 2209/08; E05B 17/22; E05B 47/0012; E06B 7/32; E05F 11/00
USPC .......... 340/5.61; 49/394, 169; 119/484, 501
See application file for complete search history.

(56) References Cited

U.S. PATENT DOCUMENTS

| | | | |
|---|---|---|---|
| 2,293,363 | A | 8/1942 | Schell |
| 3,978,616 | A | 9/1976 | Pennock |
| 4,216,743 | A | 8/1980 | Cohen |
| 4,421,058 | A | 12/1983 | Paul |
| 4,760,872 | A | 8/1988 | Hale, Jr. |
| 4,776,133 | A | 10/1988 | Green |
| 5,185,954 | A | 2/1993 | Waddle, Sr. |
| 5,469,659 | A | 11/1995 | Reid et al. |
| 5,535,804 | A | 7/1996 | Guest |
| 5,701,702 | A | 12/1997 | Reid et al. |
| 5,813,364 | A | 9/1998 | Harrison |
| 5,946,855 | A | 9/1999 | Miconi |
| 5,967,215 | A | 10/1999 | Needham et al. |

(Continued)

FOREIGN PATENT DOCUMENTS

| | | | |
|---|---|---|---|
| EP | 3199741 | B1 | 10/2019 |
| GB | 2305211 | A | 4/1997 |

*Primary Examiner* — Nam V Nguyen
(74) *Attorney, Agent, or Firm* — Baker Donelson Bearman Caldwell & Berkowitz, PC

(57) ABSTRACT

A pet door includes a motor for locking and unlocking a pet flap of a pet door. The pet flap is rotatably attached to an upper portion of the pet door. The flap has at least one peripheral edge and a movable seal coupled to the flap for reciprocal movement between a retracted position and an extended position. The seal has a second magnetic portion that is magnetically attracted to the first magnetic portion of the frame. The seal is biased to the retracted position when the door is open and the seal being magnetically biased to the extended position by the magnetic force between the first and second magnetic portions when the door is closed.

15 Claims, 29 Drawing Sheets

(56) References Cited

U.S. PATENT DOCUMENTS

| | | | | |
|---|---|---|---|---|
| 5,992,096 | A * | 11/1999 | De La Cerda .......... | E05F 15/76 160/180 |
| 6,057,675 | A | 5/2000 | Tateishi | |
| 6,141,911 | A | 11/2000 | Reid | |
| 6,297,739 | B1 | 10/2001 | Small | |
| 6,385,909 | B1 | 5/2002 | Marsh et al. | |
| 6,959,511 | B2 | 11/2005 | Johnson et al. | |
| 7,114,293 | B2 * | 10/2006 | Purlee ................... | E06B 7/2316 49/470 |
| 7,345,464 | B2 | 3/2008 | Gillis et al. | |
| 7,765,955 | B2 | 8/2010 | Brooks | |
| 7,921,811 | B2 | 4/2011 | Bosserdet, Jr. et al. | |
| 8,020,519 | B2 | 9/2011 | Stamper | |
| 8,434,264 | B2 | 5/2013 | Bosserdet, Jr. | |
| 8,826,594 | B2 * | 9/2014 | Graves ................ | E05B 47/0012 49/169 |
| 8,854,215 | B1 | 10/2014 | Ellis | |
| 8,967,085 | B2 | 3/2015 | Gillis et al. | |
| 10,941,611 | B2 | 3/2021 | Stricklin | |
| 11,629,548 | B2 * | 4/2023 | Veronika ................... | E06B 7/21 49/169 |
| 11,983,978 | B2 * | 5/2024 | Brush ...................... | G07C 9/28 |
| 2006/0252366 | A1 | 11/2006 | Eu | |
| 2008/0184940 | A1 | 8/2008 | Bosserdet et al. | |
| 2009/0051547 | A1 | 2/2009 | McFarland | |
| 2013/0176107 | A1 | 7/2013 | Dumas | |
| 2016/0186485 | A1 | 6/2016 | Taylor | |
| 2020/0408035 | A1 | 12/2020 | Miller et al. | |
| 2023/0068820 | A1 | 3/2023 | Brush et al. | |

* cited by examiner

PET DOOR

CROSS REFERENCE TO RELATED APPLICATIONS

This application is a continuation in part of U.S. patent application Ser. No. 17/901,959 filed Sep. 2, 2022, now U.S. Pat. No. 11,983,978, which claims the benefit of U.S. Application No. 63/240,161, filed Sep. 2, 2021.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present concept relates to the field of pet doors.

TECHNOLOGY IN THE FIELD OF THE INVENTION

Conventional pet doors are typically installed in a barrier, such as a residential door or wall, to enable a domestic pet to traverse through the barrier by way of the pet door. These pet doors oftentimes include a frame with a hinged flap or swinging door. The frame defines a passageway of sufficient size to allow a pet to pass through, and is typically installed by first cutting a through-opening in the barrier. The frame cooperates with the barrier at the through-opening such that, when the frame is installed, the passageway is defined at the through-opening to the extent that the passageway provides a passage through the structure.

The flap is disposed proximate the passageway and is movable between a closed position and an open position. When in the closed position, the flap substantially covers the passageway such that environmental elements do not pass there through. When in the open position, the flap permits the pet to pass through the passageway.

Hinged door designs utilize either a pliable flap material or a rigid panel that insulates from heat and cold by maintaining a releasable seal around the edges of the frame. Various mechanisms are used to create this seal. These include rubber sealing strips, pile (brush) strips, or felt pads.

The flap itself is typically held in its closed (or sealed) position by gravity. In this respect, the weight of the hinged flap causes the flap to hang in its closed position below a hinge mechanism. Commonly, a magnetic attraction is formed by magnets in the flap, in the bottom sill of the frame, or both, to further bias the flap in its closed position.

A common deficiency of such designs is the occurrence of wind, which can either push or pull at the flap, causing the seal to be broken. In addition, differences in pressure between the inside of a residence and the outside can cause a hinged flap to be pushed or pulled. The flap may not conform precisely to the passageway, thereby creating a gap between the flap and passageway. Even a slight crack in the seal can result in energy inefficiency and discomfort to residents as outside air is exchanged in the home. Lastly, for the weather stripping to ensure a good seal it would need to have interference fit with the passageway. This interference can interfere with the flaps ability to reliably close, causing the flap to hang open and not provide a seal against the elements.

Another problem with these doors is that they may allow other, unwanted animals to enter the house. As such, unrelated dogs, cats, or even undomesticated animals may enter the home. A similar situation may arise wherein the pet door also allows animals to exit the house, yet it does not prevent the passage of animals that are not intended to leave the home. For example, the door is intended to be used to allow the passage of a dog, however, the door unintentionally allows the passage of another dog or cat that is meant to remain inside the home.

Accordingly, a need exists for an improved animal door wherein the seal of a hinged flap is maintained, the door provides limited access to select animals, and the door is latched to provide selective ingress and egress, and the seal does not interfere with the closing of the door through contact with the door passageway.

BRIEF SUMMARY OF THE INVENTION

A pet door comprises a frame defining a passageway therethrough, the frame having a first magnetic portion positioned closely adjacent the passageway, and a flap pivotally coupled to the frame for movement between a closed position adjacent the frame and an open position away from the frame, the flap having a peripheral edge at least partially defining the flap. The pet door also has a movable seal coupled to the peripheral edge of the flap for reciprocal movement between a retracted position proximal the flap peripheral edge and an extended position distal the flap peripheral edge, the movable seal having a second magnetic portion that is magnetically attracted to the first magnetic portion of the frame, the movable seal being movable to the retracted position when the door is pivoted to its open position and the movable seal being magnetically moved to its extended position through the magnetic attraction between the first and second magnetic portions when the door is in its closed position.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1A:
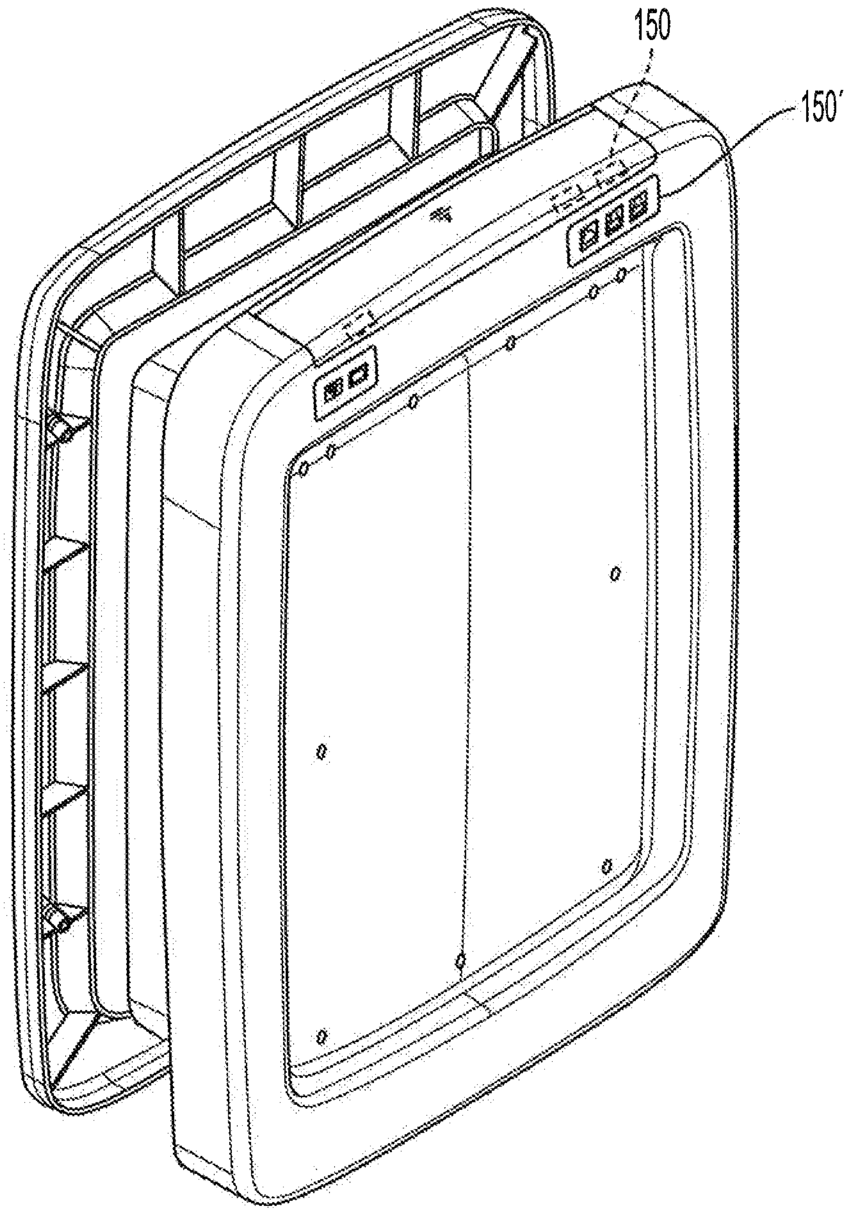
FIG. 1A is a perspective rear view of a pet door, shown with a front portion separated from a rear portion to simulate the positioning when mounted to a door.
Figure 1B:
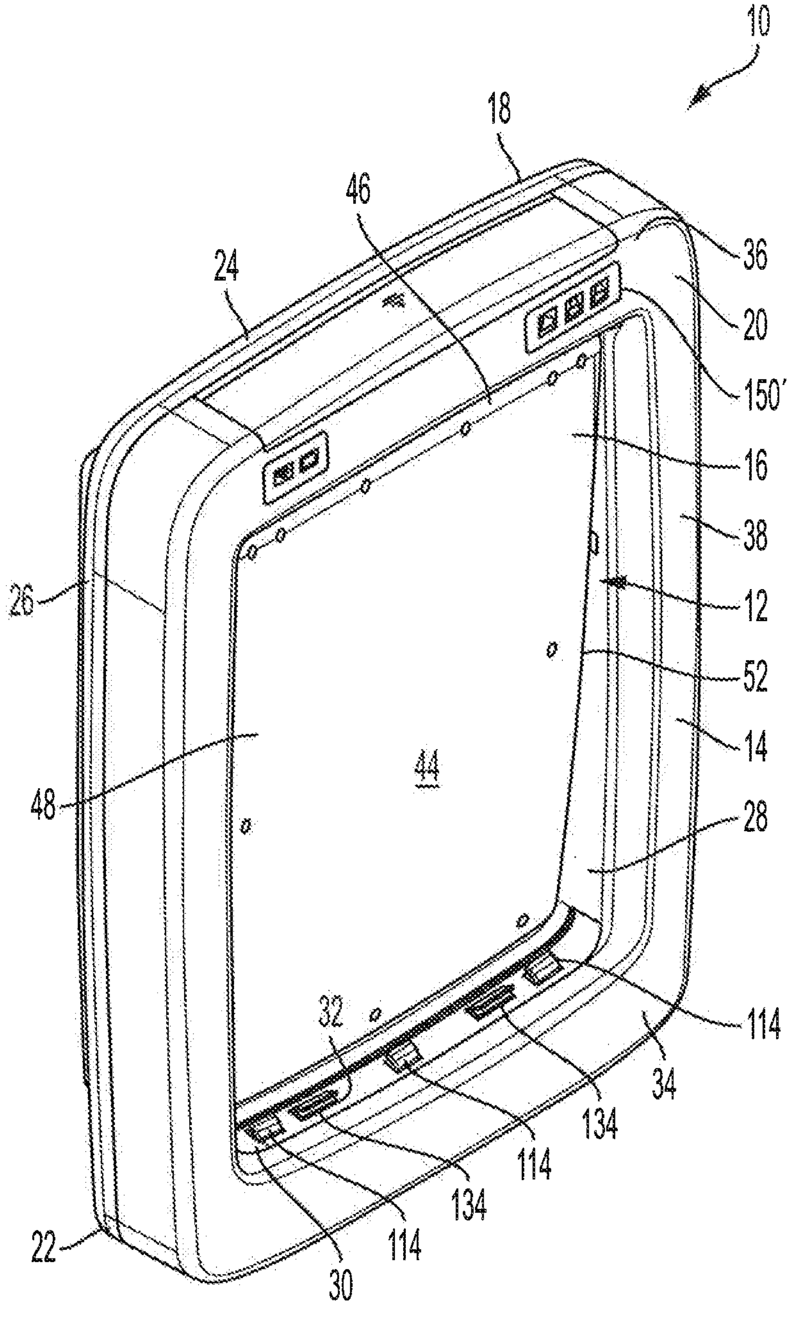
FIG. 1B is a perspective, rear view of the pet door of FIG. 1A.

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Description of Selected Specific Embodiments

With reference next to the drawings, there is a shown pet door 10 under an embodiment. The pet door 10 is mounted to a barrier D, such as the door of a home, and above the floor of the house. The pet door 10 automatically grants a selected, registered pet or animal access through a through-way 12 defined by the pet door 10 and denies a non-selected, unregistered animal access through the through-way 12.

The pet door 10 includes a generally rectangular frame 14 and a pivotal flap 16 coupled to the frame 14. The frame 14 has an exterior, first, or front portion 18 and an interior, second, or rear portion 20 coupled to the front portion 18 so as to sandwich the door therebetween. The front portion 18 has a bottom section 22, a top section 24, and two sidewall sections 26 extending between the bottom section 22 and top section 24.

The rear portion 20 also has a bottom section 34, a top section 36, and two sidewall sections 38 extending between the bottom section 34 and top section 36. The rear portion 20 also has a tubular passageway 28 defining the through-way 12. The rear portion 20 is mounted in register with the front portion 18. The bottom section 34 has three interior latch openings 30 and two exterior latch openings 32 extending therethrough.

The flap 16 is constructed of a substantially rigid material, such as, but not limited to, a plastic, and includes an interior or inside surface 44 and an exterior or outside surface 42 opposite the inside surface 44. The flap 16 is disposed within the passageway 28 such that the peripheral contour of the flap 16 is substantially aligned or in conformity with the corresponding contour of the passageway 28. The flap 16 pivots bi-directionally at an upper hinge or pivot 46 in response to a lateral force being applied to the flap 16, such as an animal pushing upon the flap 16.

Figure 2:
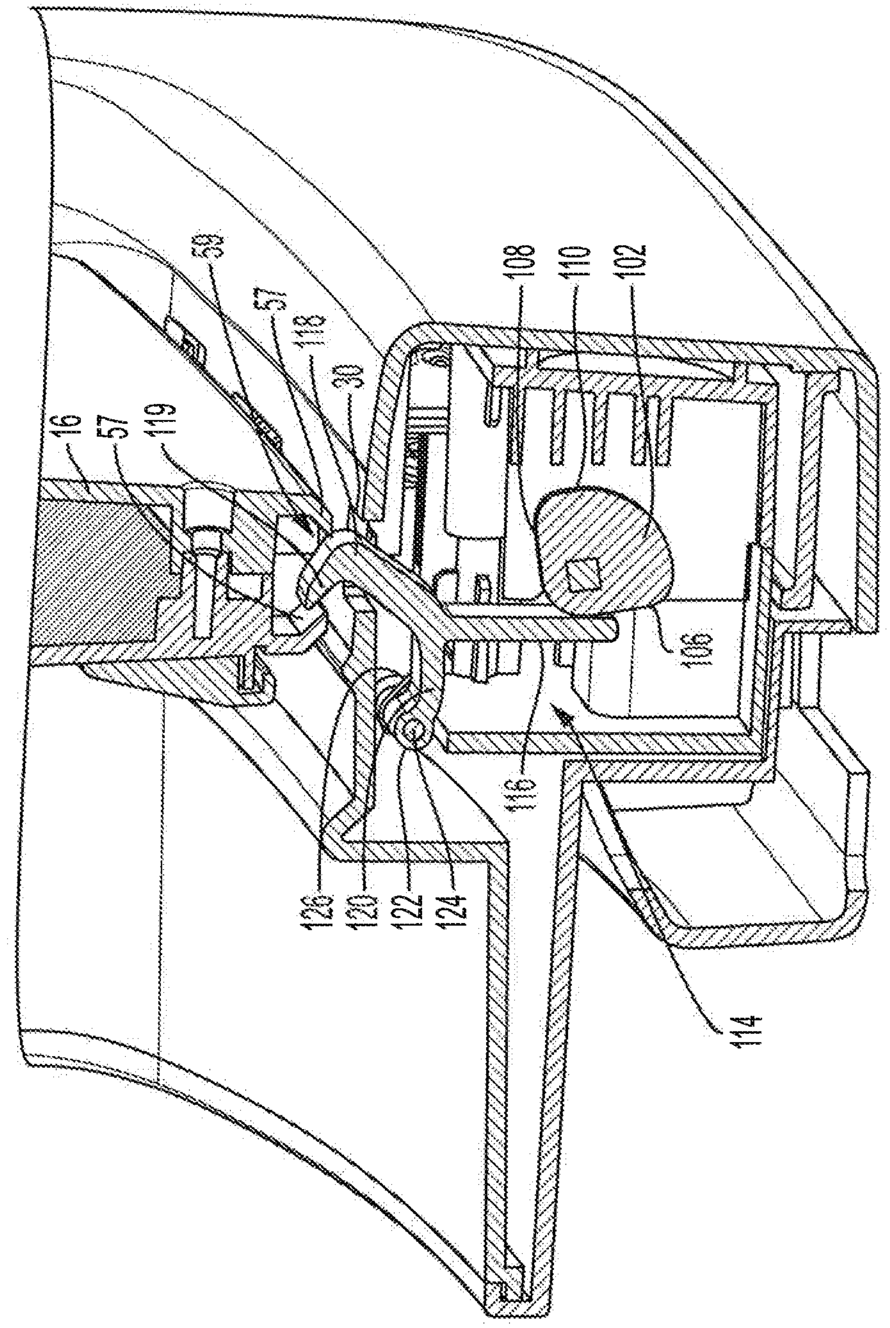
FIG. 2 is a perspective view of the locking mechanism of the pet door of FIG. 1A, showing the interior latches in a locked position.
Figure 3:
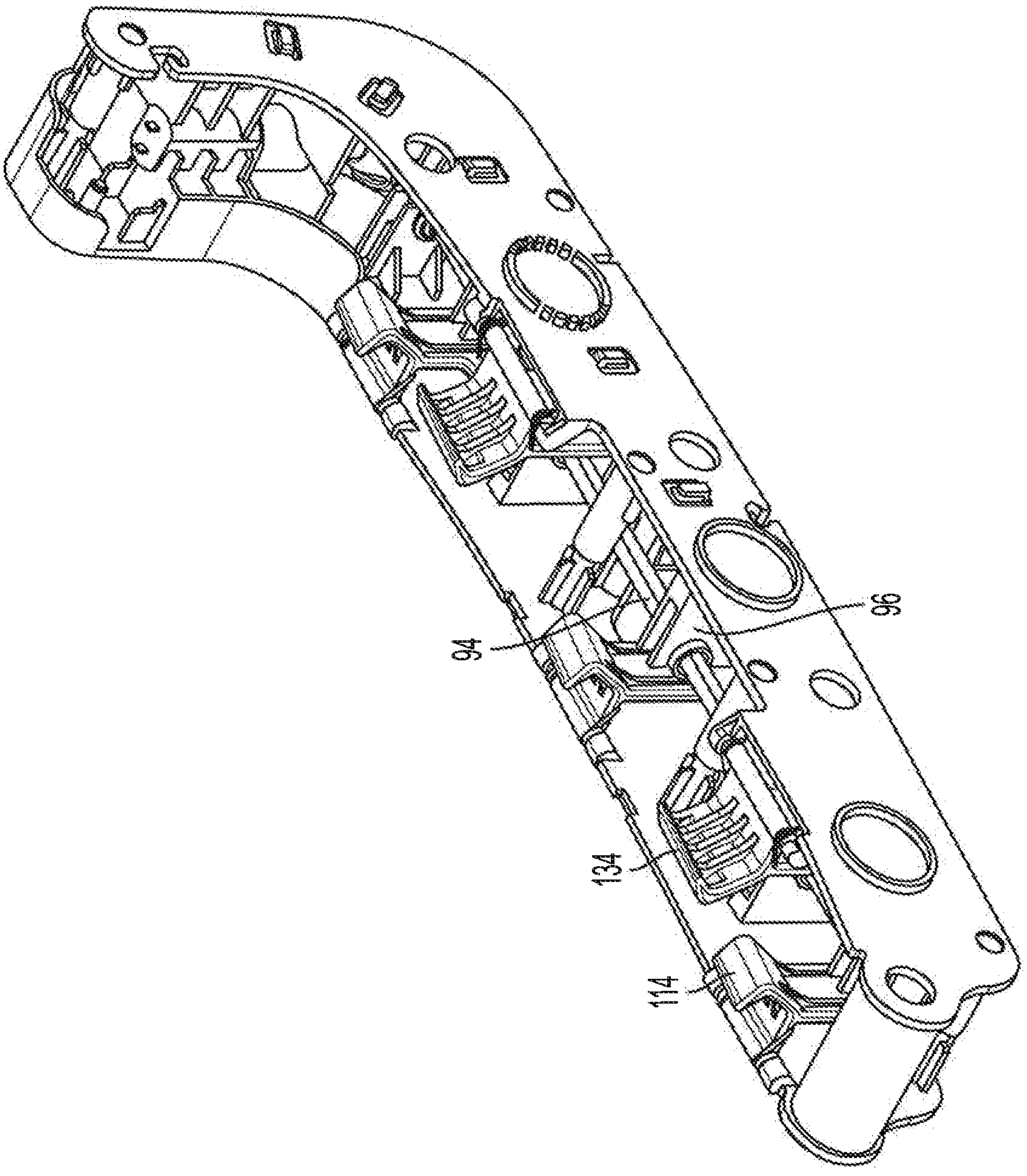
FIG. 3 is a perspective view of the locking mechanism of the pet door of FIG. 1A, showing the interior latches in a locked position and the exterior latches in a locked position.
Figure 20:
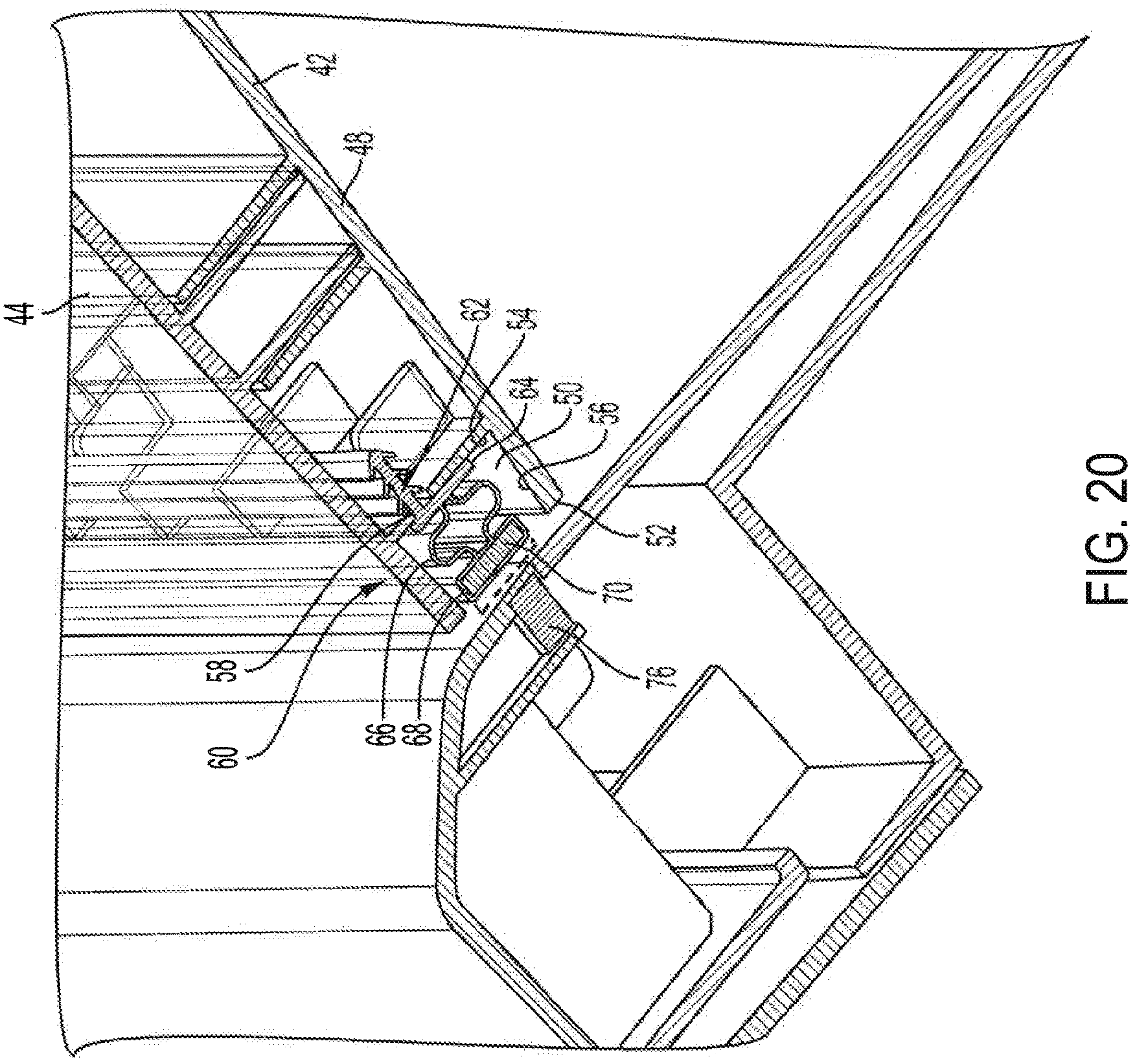
FIG. 20 is a perspective view of a portion of the pet door of FIG. 1A, showing the magnetic seal in a retracted position in solid lines and showing the magnetic seal in an extended position in phantom lines once the door is in a closed position.

The flap 16 includes a central portion 48 with peripheral side channels 50 extending inwardly from a peripheral edge 52. Each peripheral side channel 50 has a floor 54 and two outwardly extending sidewalls 56. (Best seen in FIG. 20). The floor 54 has a series of mounting slots 58 therein. The flap central portion 48 also has a bottom locking channel or pocket 59 extending inwardly from the bottom edge of the central portion 48. The bottom locking pocket 59 is partially defined by pocket side walls 57 as seen in FIG. 2.

Figure 21A:
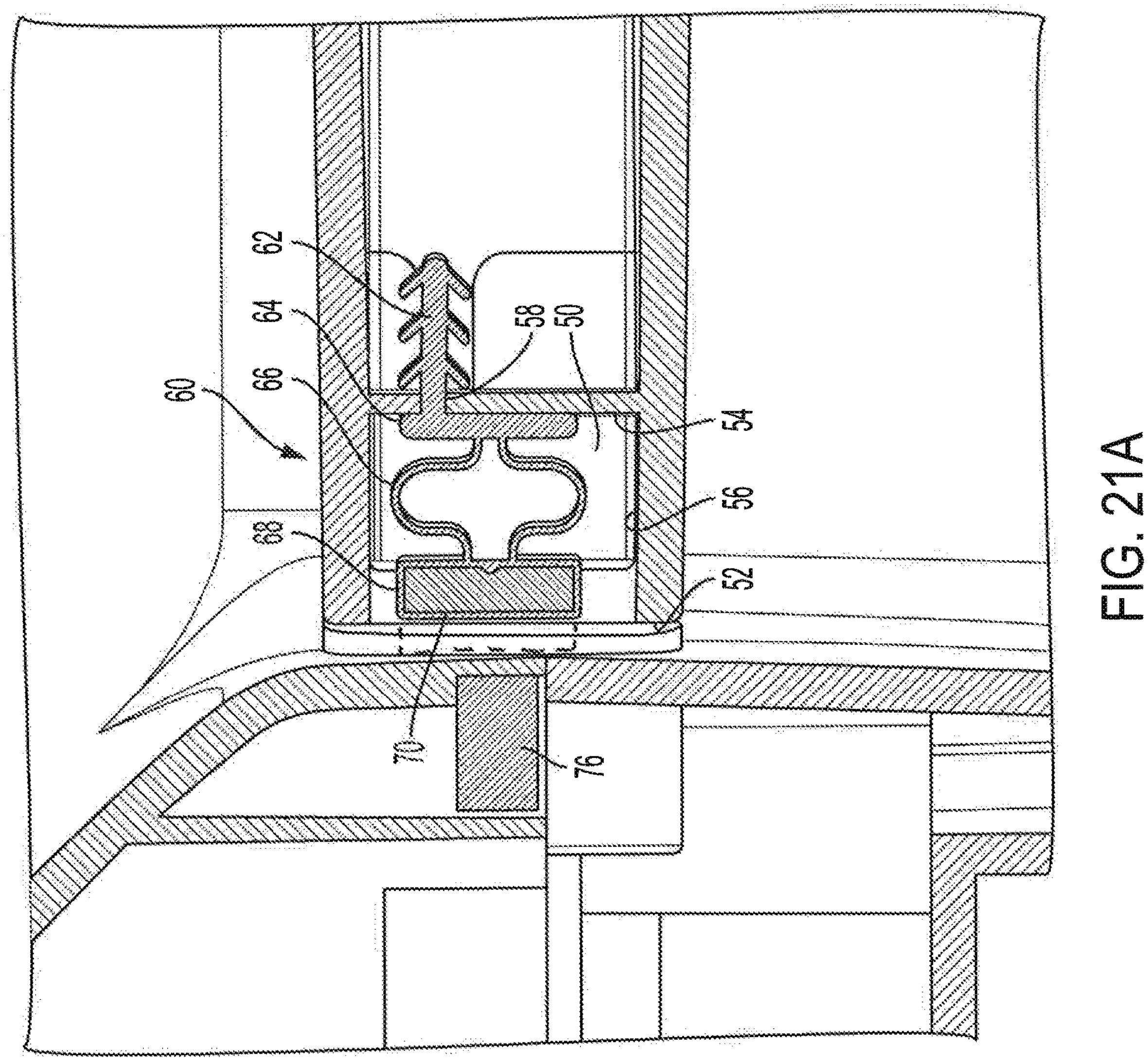
FIG. 21A is a cross-sectional view of a sealing portion of the pet door of FIG. 1A, showing the magnetic seal in a retracted position in solid lines and showing the magnetic seal in an extended position in phantom lines once the door is in a closed position.
Figure 21B:
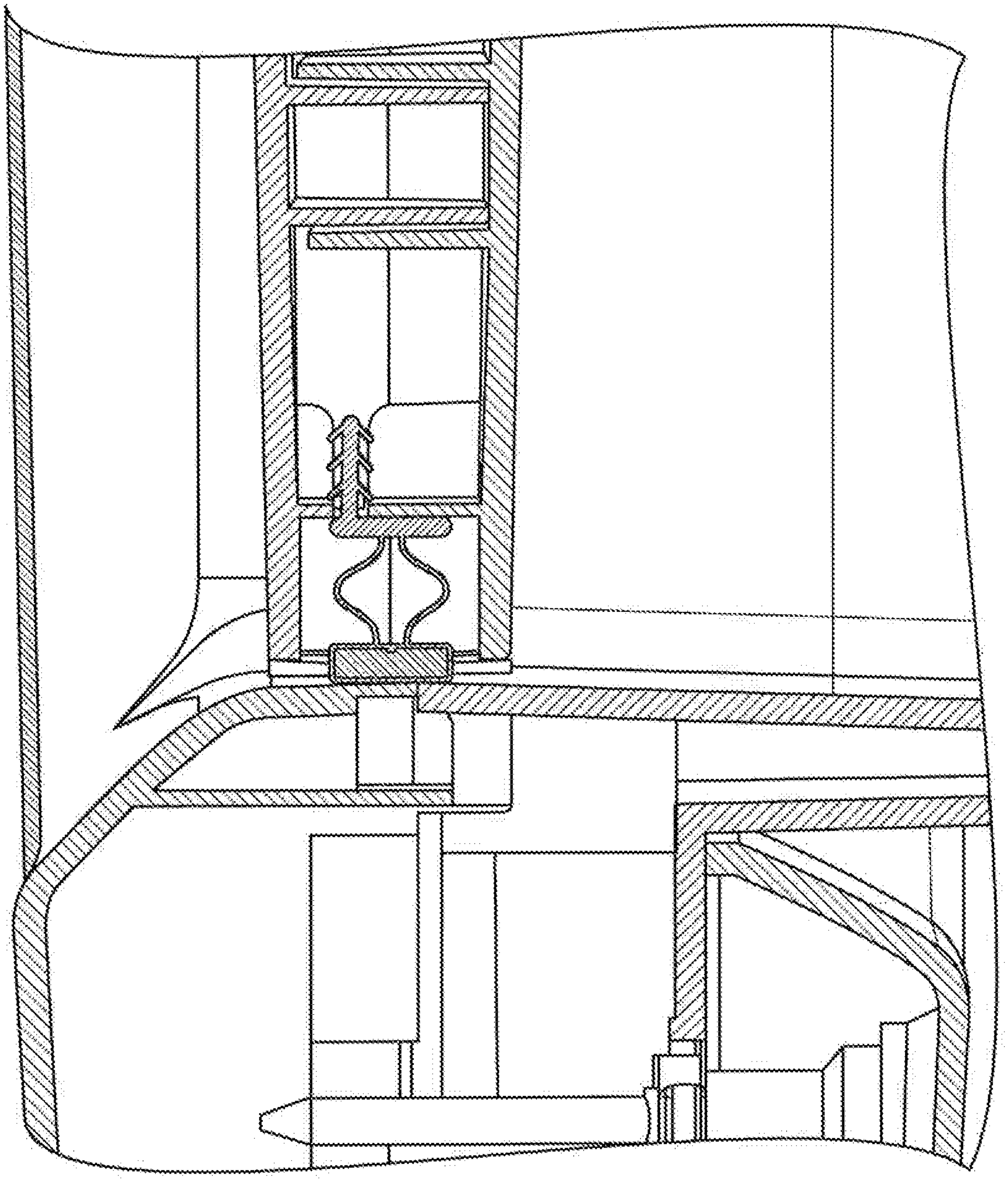
FIG. 21B is a cross-sectional view of a sealing portion of the pet door of FIG. 1A, shown in an extended position when the door is in a closed position.

The flap 16 also has a movable, flexible and resilient peripheral weather-stripping or seal 60 positioned within the peripheral side channel 50 of the central portion 48. The seal 60 includes a Kerf type mounting flange 62 that is configured to be mounted within the mounting slots 58 of the peripheral side channel 50. The mounting flange 62 extends to a base 64 which in turn extends to a resilient, spring-like, tubular compressible portion 66. A tubular, rectangular magnetic holder 68 extends from the compressible portion 66. A magnet or ferrous material 70, such as flex steel, is positioned within the magnetic bolder 68. The seal 60 is designed to flex, expand and contract, so that the distance between the magnet holder 68 and the base 64 may reciprocally vary between an extended position shown in FIG. 21B wherein the magnet holder 68 is distal the base 64 and a retracted position shown in FIG. 21A wherein the magnet holder 68 is proximal the base 64. When in the extended position, the magnetic holder 68 extends at least partially past the confines of the peripheral side channel 50, i.e., past the peripheral edge 52 of the peripheral side channel 50. When the magnet or ferrous material 70 is not attracted to 76 the compressible portion 66 biases the magnetic holder 68 and magnet/ferrous material 70 therein to the retracted position.

The frame rear portion 20 has a series of magnets 76 (or ferrous material) mounted within the rear portion 20 adjacent the passageway 28 and oppositely disposed from the through-way 12. The magnets 76 (or ferrous material) are positioned along the passageway 28 in the area or position wherein the flap 16 is intended to reside when in an unbiased, neutral, or natural position. The magnets 76 (or ferrous material) are intended to magnetically interact with the magnets or ferrous material 70 of the seal 60.

The pet door 10 also includes a latching assembly 80 that selectively allows and prevents the pivoting motion of the flap 16, through locking and unlocking of the flap 16. The vast majority of the latching assembly resides within the interior of the frame 14.

Figure 4:
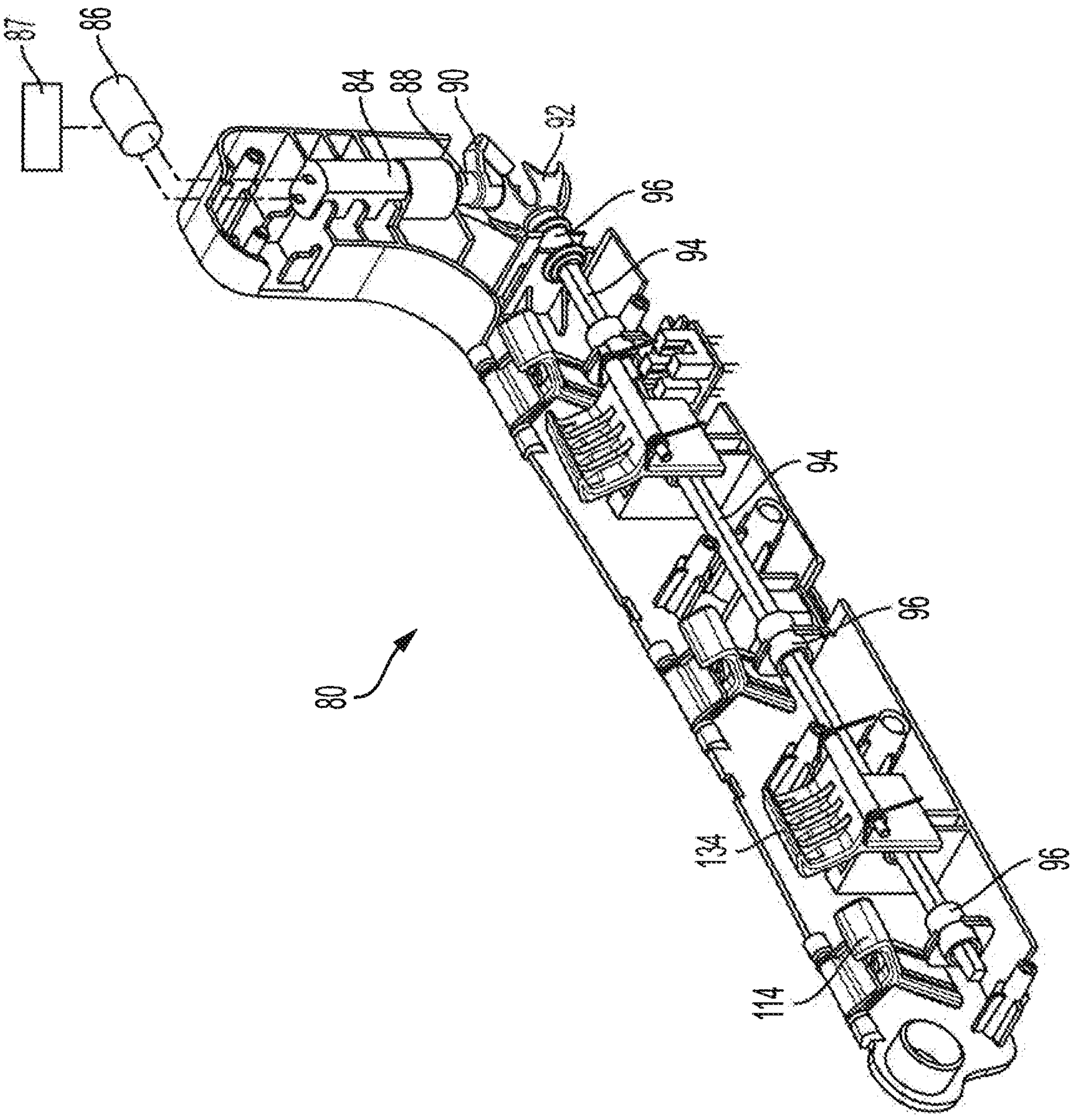
FIG. 4 is a perspective view of the locking mechanism of the pet door of FIG. 1A, showing the interior latches in an unlocked position and the exterior latches in a locked position.
Figure 5:
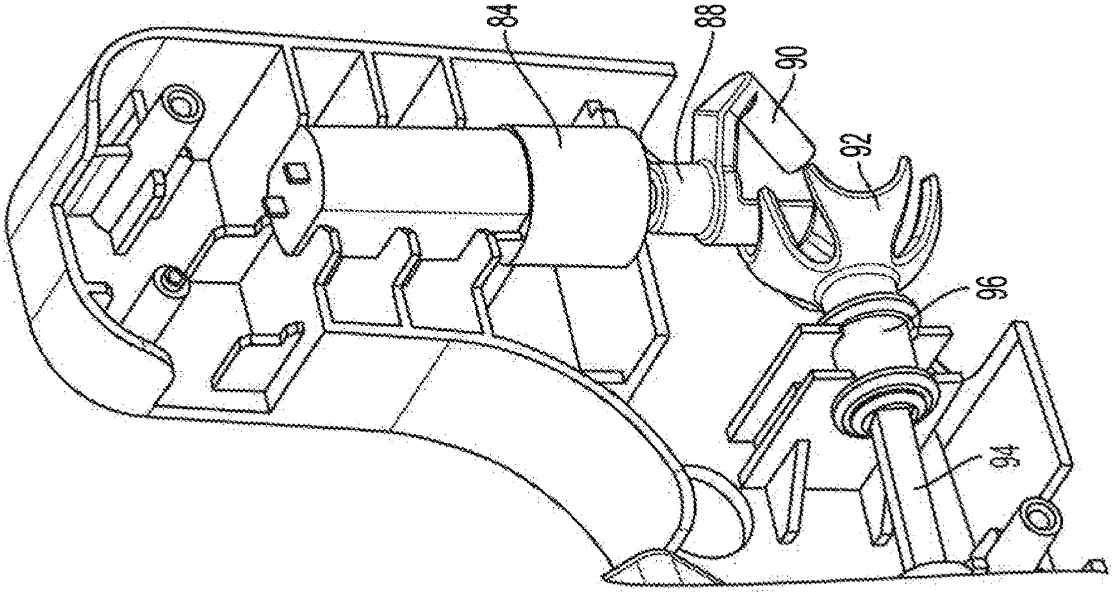
FIG. 5 is a perspective view of the locking mechanism of the pet door of FIG. 1A, showing the motor and right angle Geneva wheel portion of the locking mechanism.
Figure 6:
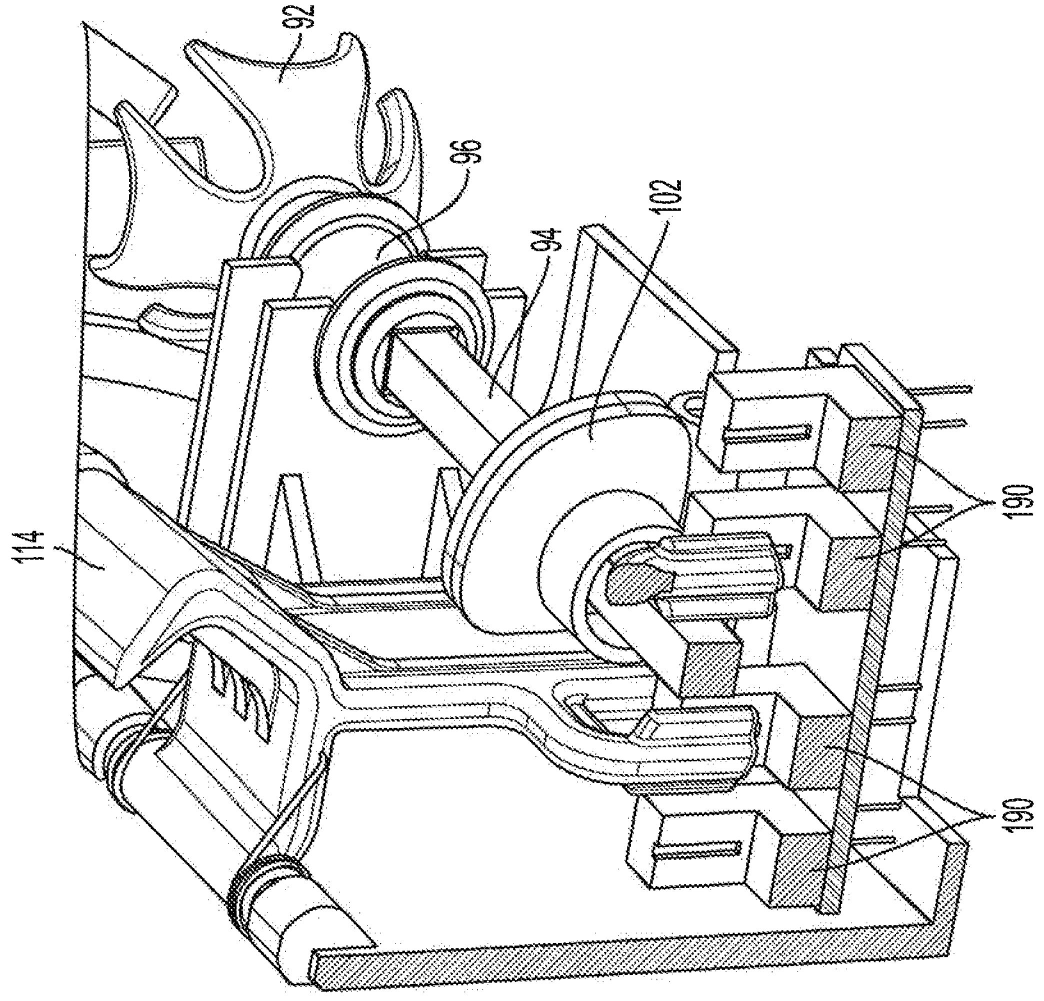
FIG. 6 is a perspective view of the locking mechanism of the pet door of FIG. 1A, showing the interior latches in a locked position.
Figure 7:
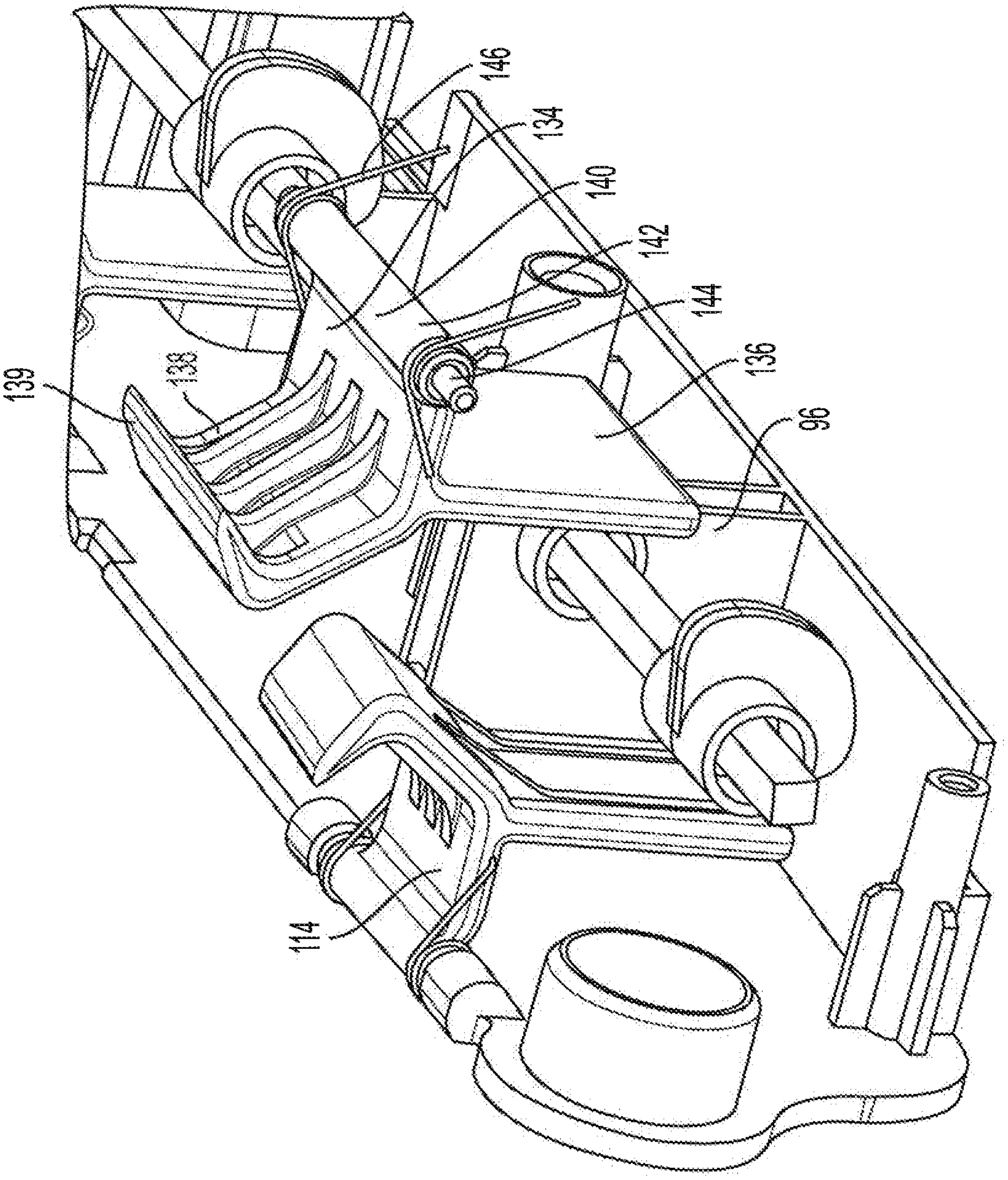
FIG. 7 is a perspective view of the locking mechanism of the pet door of FIG. 1A, showing the interior latches in a locked position and the exterior latches in a locked position.
Figure 8:
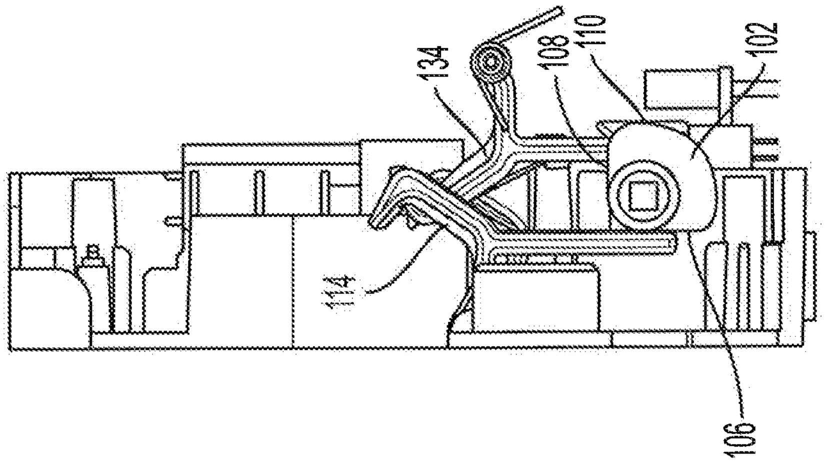
FIG. 8 is a side view of the locking mechanism of the pet door of FIG. 1A, showing the interior latches in a locked position and the exterior latches in a locked position.
Figure 9:
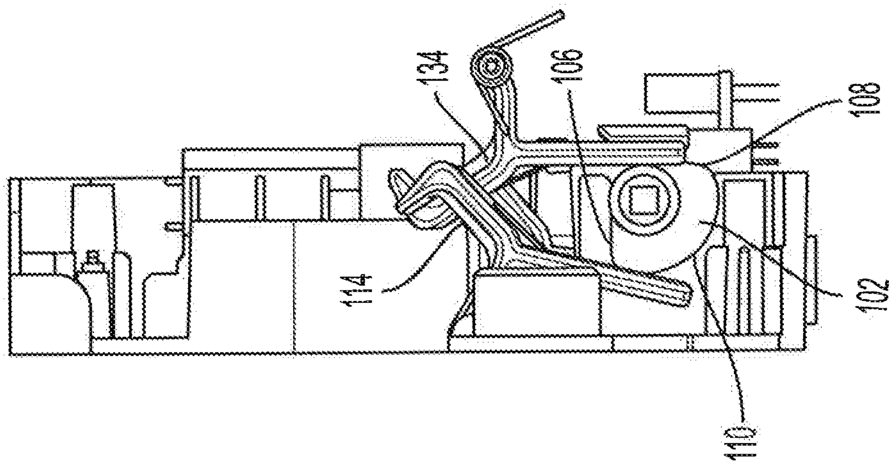
FIG. 9 is a side view of the locking mechanism of the pet door of FIG. 1A, showing the interior latches in an unlocked position and the exterior latches in a locked position.
Figure 10:
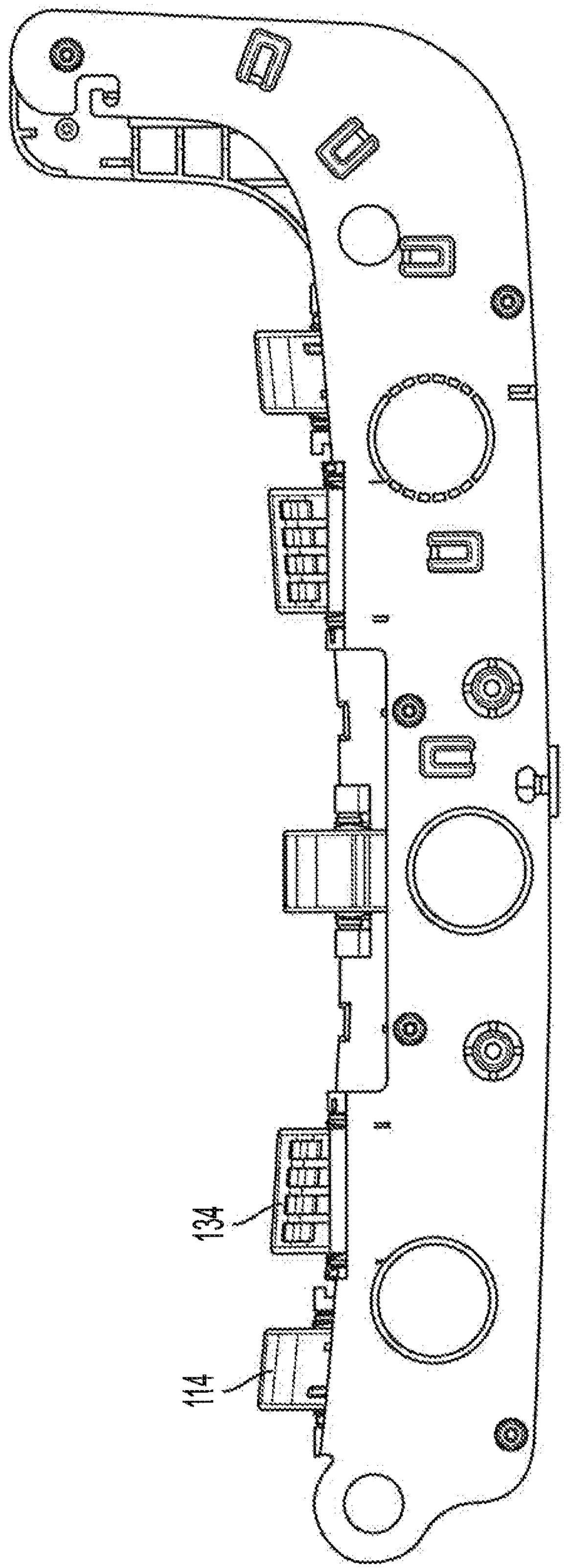
FIG. 10 is a rear view of the locking mechanism of the pet door of FIG. 1A, showing the interior latches in a locked position and the exterior latches in a locked position.

The latching assembly 80 includes a 6-volt DC electric motor 84 mounted to and within the sidewall section 38 of the frame 14, as best shown in FIGS. 4 and 5. The electric motor 84 is electrically coupled to a DC power source 86 and a microcontroller 87. The electric motor 84 includes a drive shaft 88 that is coupled at its opposite end to a rotating drive pin or Geneva pin 90, which in turn is coupled to a spherical drive wheel or Geneva wheel 92. The Geneva wheel 92 is coupled to an elongated cam drive shaft 94 that is maintained in place by bearing collars 96. The operation of the electric motor 84 causes a complete rotation of the Geneva pin 90, which in turn rotates the Geneva wheel 92 approximately 90 degrees.

A pair of exterior latch cams 100 and three interior latch cams 102 are mounted for rotation to the cam drive shaft 94. Each exterior latch cam 100 and interior latch cam 102 includes a first low rise or flat lobe or portion 106, a second low-rise or flat lobe or portion 108 and a high rise or curved lobe or portion 110 extending between the first low-rise portion 106 and second low-rise portion 108, as best shown in FIG. 2.

Each interior latch cam 102 is configured to drive a corresponding Y-shaped interior latch 114. Each interior latch 114 includes a cam follower 116 extending to an L-shaped catch 118 having an end tang 119. A mounting arm 120 extends from the junction of the cam follower 116 and catch 118. The mounting arm 120 has a mounting boss 122 that is journaled upon a mounted pivot pin 124 coupled to the interior of the frame 14. A double-bodied torsion spring 126 is mounted to the pivot pin 124 and coupled to the interior latch 114 so as to bias the interior latch cam follower 116 towards interior latch cam 102. The end tang 119 is sized and shaped, or otherwise configured, to reciprocally move into and temporarily reside within and engage the flap bottom locking channel 59. Each interior latch catch 118 extends through a corresponding interior latch opening 30 of the frame bottom section 34. The end tang 119 is specifically configured to lockably engage the pocket side wall 57. Cam/latch position sensors 190 monitor the cam/latch position locations.

Each exterior latch cam 100 is configured to drive a corresponding Y-shaped exterior latch 134. Each exterior latch 134 includes a cam follower 136 extending to an L-shaped catch 138 having an end tang 139. A mounting arm 140 extends from the junction of the cam follower 136 and catch 138. The mounting arm 140 has a mounting boss 142 that is journaled upon a mounted pivot pin 144 coupled to the interior of the frame 14. A double-bodied torsion spring 146 is mounted to the pivot pin 144 and coupled to the exterior latch 134 so as to bias the exterior latch cam follower 136 towards exterior latch cam 100. The end tang 139 is sized and shaped, or otherwise configured, to reciprocally move into and temporarily reside within and engage the flap bottom locking channel 59. Each exterior latch catch 138 extends through a corresponding exterior latch opening 32 of the frame bottom section 34. The end tang 139 is specifically configured to lockably engage the pocket side wall 57. Cam/latch position sensors (analogous to the position sensors described in the previous paragraph) monitor the cam/latch position locations.

In use, when the flap 16 is in an unbiased, closed, or natural position, the magnets 76 magnetically pull upon the magnets or ferrous material 70 of the seal 60 so that the magnetic holder 68 portion of the seal 60 extends from the peripheral side channel 50 to its extended position adjacent the frame and into contact with the passageway 28, thereby providing a good seal between the flap 16 and the frame passageway 28. The magnetic holder 68 is allowed to move outwardly to its extended position due to the flexible or reciprocal, compressible nature of the compression portion 66, i.e., the tubular compression portion 66 elongates in the lateral direct of movement of the magnetic holder 68.

When the flap 16 is pivoted inwardly or outwardly from its neutral position to its open position away from the frame, the immediate absence of the magnetic attraction between the magnets 76 and the magnets or ferrous materials 70 within the seal 60 causes the compression portion 66 to rebound or compress and retract the magnetic holder 68 back into the peripheral side channel 50 of the flap 16. As the magnetic holder 68 is retracted, there is an unencumbered movement of the flap 16. The lack of contact between the magnetic holder 68 and the passageway 28 also prevents the wearing of the seal 60, thereby prolonging the life of the seal 60 and its sealing quality.

The latching assembly 80 of the pet door 10 controls the ability for the flap 16 to pivot inwardly towards the interior of the home and to pivot outwardly towards the exterior of the home. The inward pivoting of the flap 16 provides access or ingress of the animal from the outside into the house, while the outward pivoting of the flap 16 provides for exiting or egress of the animal from the house to the outside.

Figure 22:
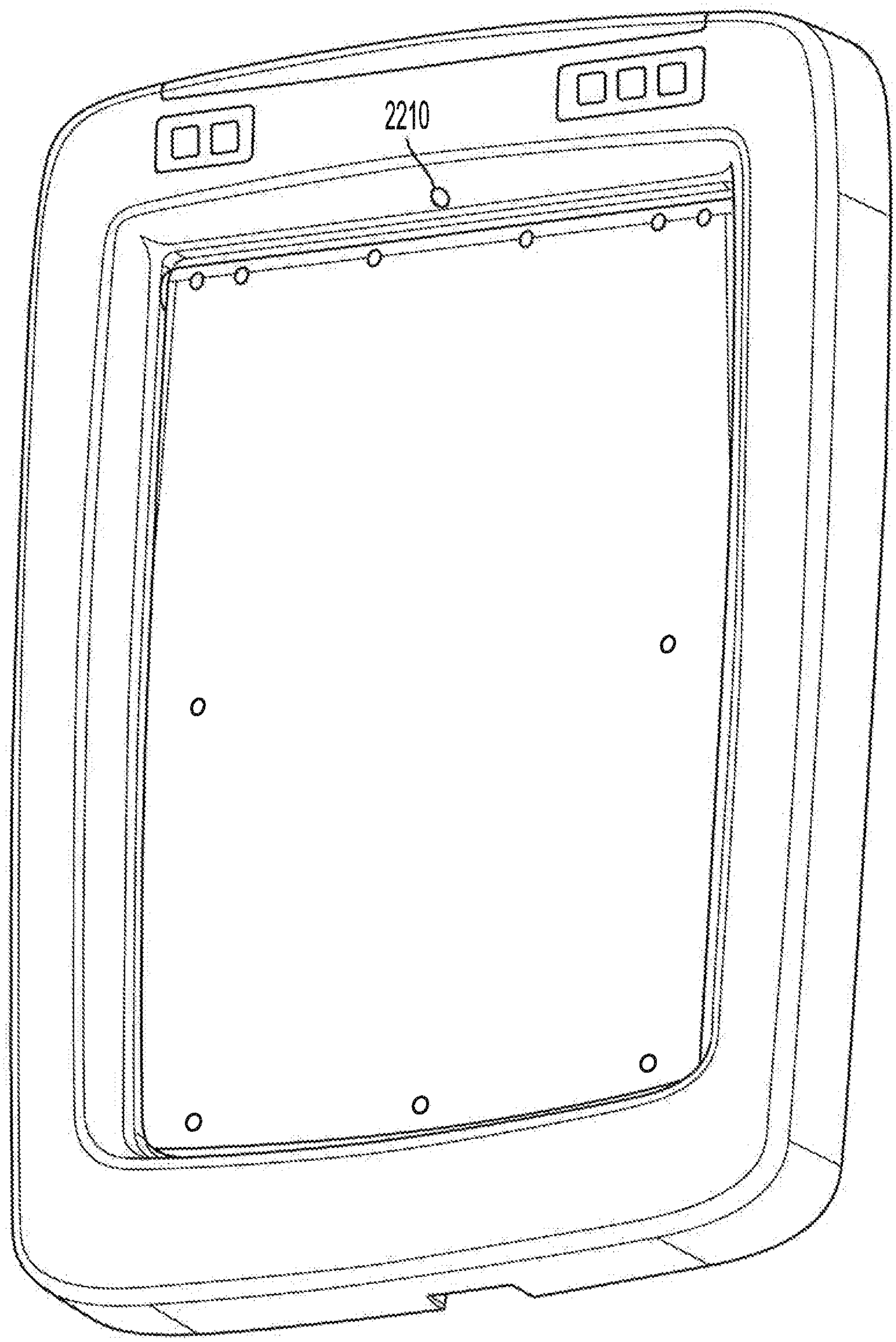
FIG. 22 is a perspective rear view of the pet door of FIG. 1A.
Figure 23:
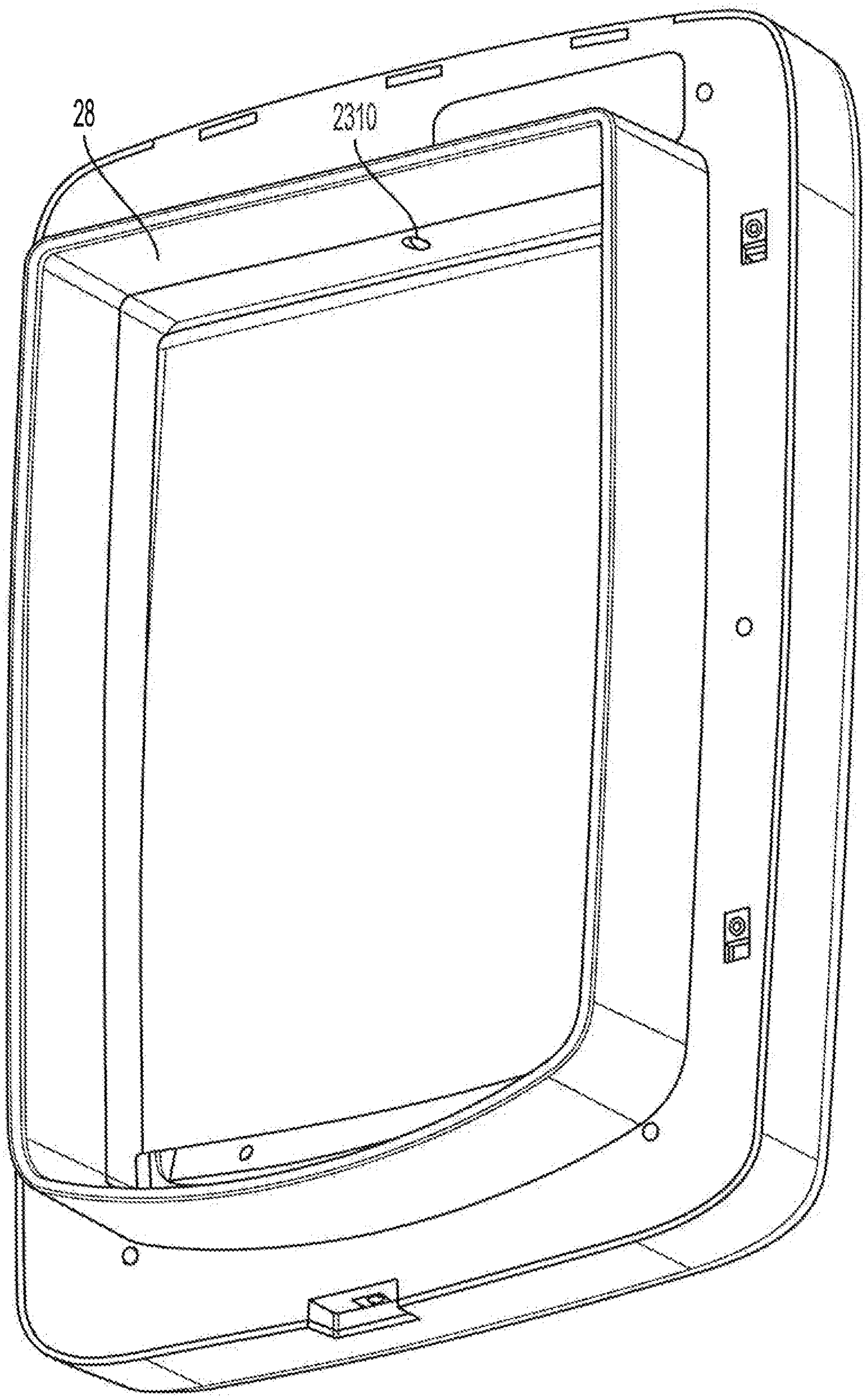
FIG. 23 is a perspective front view of the pet door of FIG. 1A.

The frame includes an interior PIR lens and an exterior PIR lens. FIG. 22 shows an interior PIR lens 2210 positioned in the top section 36 of the frame 14. FIG. 23 shows an exterior PIR lens 2310 positioned in the passageway 28. The interior PIR lens is positioned to detect motion approaching an interior side of the door. Each PIR lens comprise PN: 8120-2 components from MFG: Senba Sensing Technology Co. The PIR lens components are communicatively coupled with a single PIR Sensor PN: D203S from MFG: Senba Sensing Technology Co. (as further described below).

Figure 24:
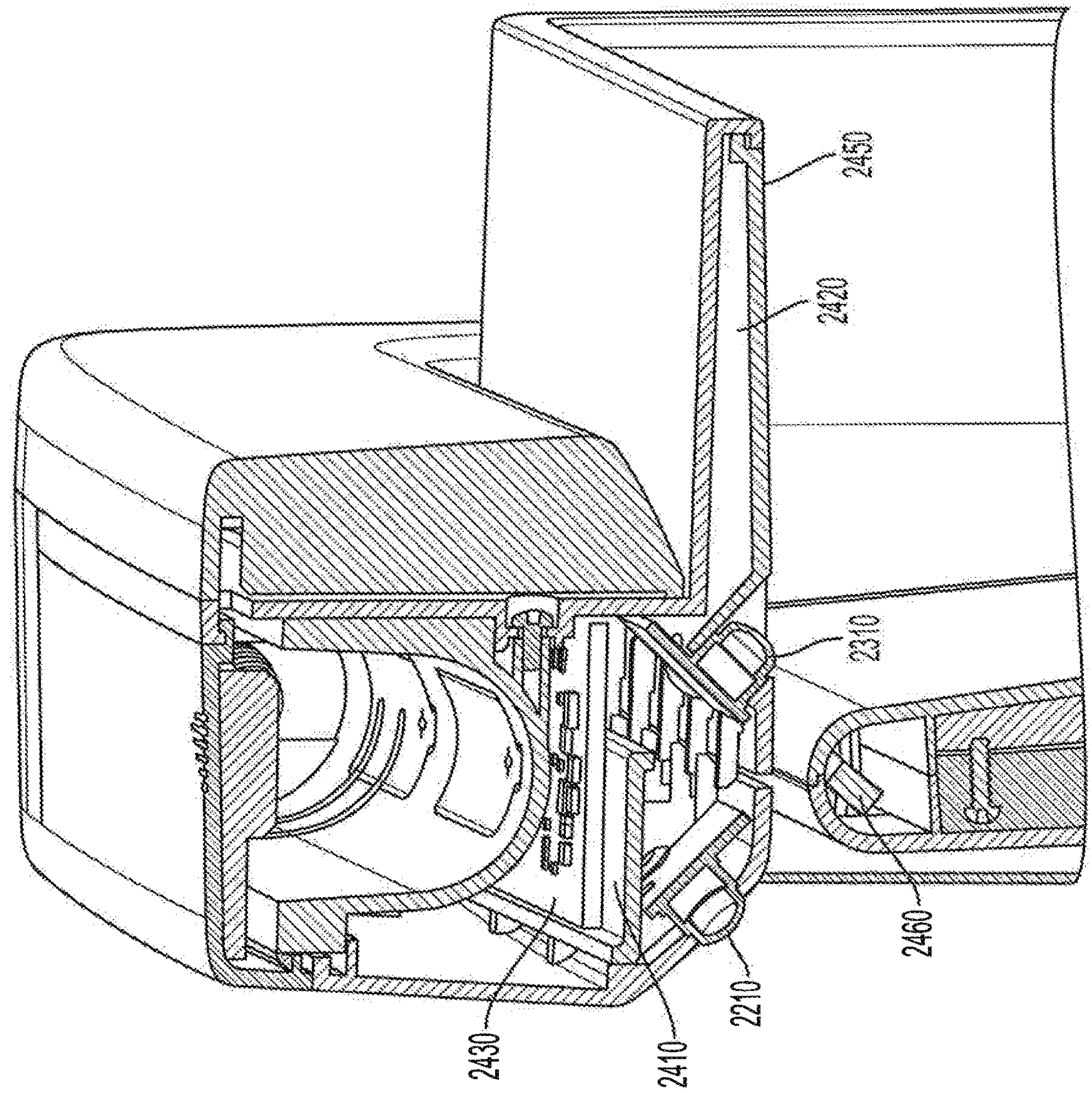
FIG. 24 is a cross sectional view of the pet door of FIG. 1A.

FIG. 24 shows a cross sectional view of the pet door illustrating the position of interior PIR lens 2210 and exterior PIR lens 2310. Each PIR sensor/lens is mounted at approximately a 45 degree downward angle from the top of the door. This orientation coupled with a focused narrow lens view angle allows for a detection range of approximately 4 ft when an animal approaches the door head on in either direction. A limited detection range is beneficial for battery life, in that the microprocessor will not unnecessarily search for pets via the RFID reader when no pet is present.

A detection PIR sensor signal is an analog voltage signal, which allows the door to have configurable and/or adaptive activation thresholds.

Figure 27:
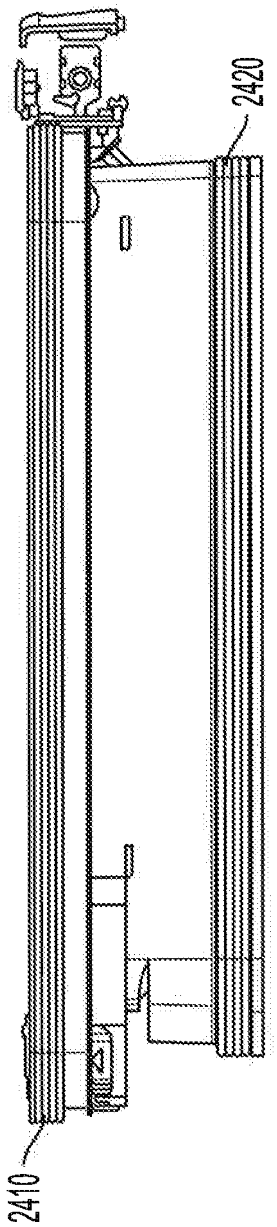
FIG. 27 shows the position of RFID reader coils.

The frame embodies an RFID reader and two RFID antennas—an interior RFID antenna (also referred to as interior antenna or interior antenna coil) and an exterior RFID antenna (also referred to as exterior antenna or exterior antenna coil) as seen in FIG. 24. The interior RFID antenna 2410 comprises a coil surrounding an interior frame within rear portion 20 and passing underneath a Printed Circuit Board Assembly 2430. The exterior RFID antenna 2420 comprises a coil disposed around a tunnel component 2450 that surrounds the flap 16 and that extends outwardly from the frame. FIG. 27 shows interior antenna coil 2410 and exterior antenna coil 2420. The microprocessor searches for a pet wearing an RFID tag either inside or outside by selecting the interior RFID antenna or the exterior RFID antenna via a relay.

When the interior or exterior PIR sensor detects motion through a corresponding interior or exterior PIR lens, the respective sensor outputs an analog voltage signal. To realize maximum battery life, the microprocessor remains in a low power state when no pets are present. The microprocessor periodically wakes from its low power state and checks the inside and outside PIR sensors for motion. When the signal is above an activation threshold value, the microprocessor employs the RFID reader electronics (further described below) to search for an RF Tag worn by the pet. If motion is detected by the microprocessor checking interior PIR sensor through the interior PIR lens, the microprocessor selects the inside antenna and employs the RFID reader electronics to search for an RFID tag worn by a pet inside the door. Conversely, if motion is detected by the microprocessor checking exterior PIR sensor through the exterior PIR lens, the microprocessor selects the outside antenna and employs the RFID reader electronics to search for an RFID Tag worn by a pet located on the outside of the door. Under an alternative embodiment, the RFID reader electronics may read an implanted microchip.

Further, the frame includes a magnet 2460 (as seen in FIG. 24) which cooperates with a Hall Effect Flap sensor 2536 for detecting the angle of the door relative to a vertical plane. The magnet comprises a fixed position relative to the flap. As the flap moves in either direction, the magnet rotates accordingly. The Hall Effect Flap sensor detects the magnetic field of the magnet and uses information of the magnetic field and known position of the magnet relative to the flap to determine flap angle relative to the vertical plane.

Figure 25:
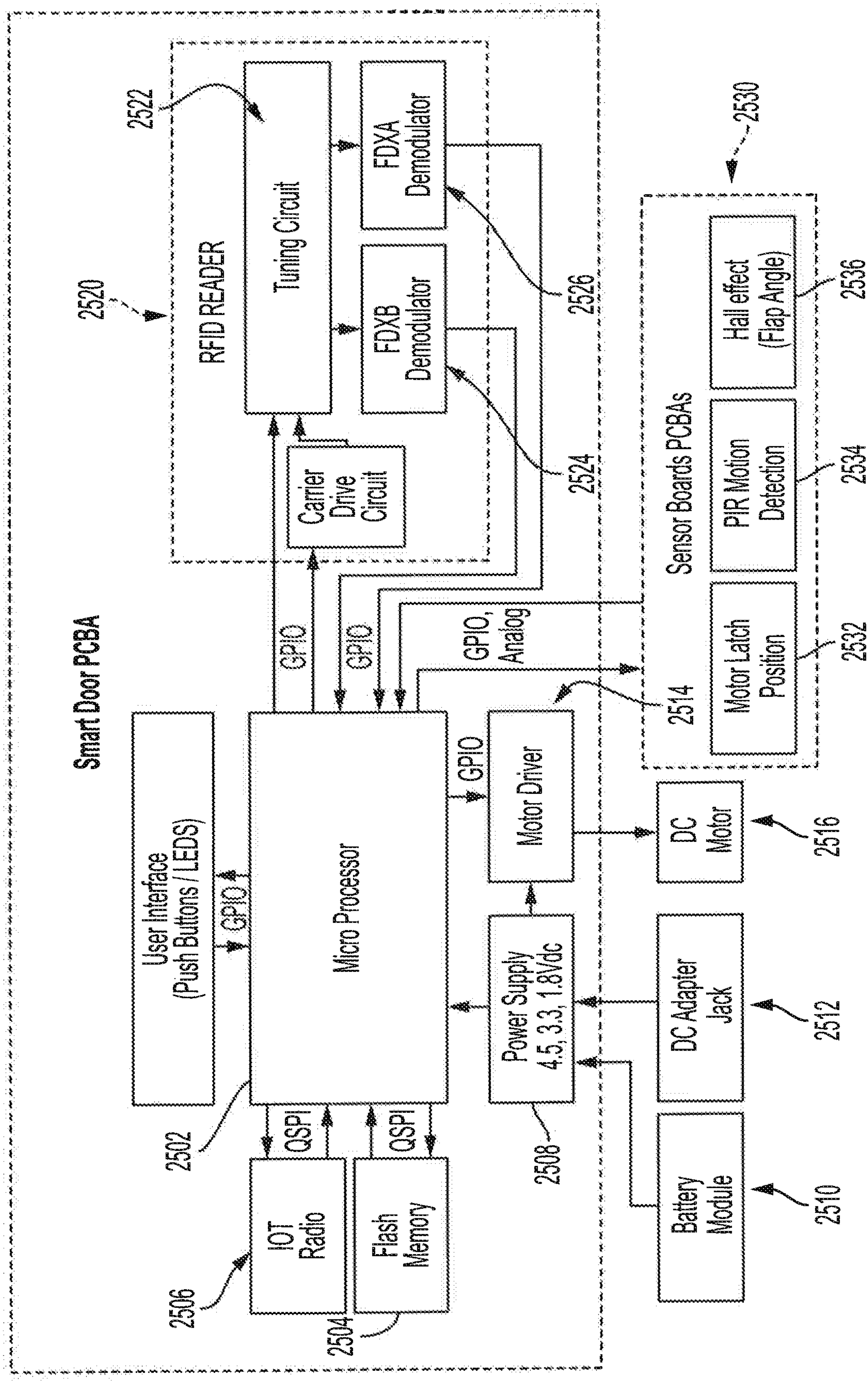
FIG. 25 is a block diagram showing components of a PCBA located within an interior of the pet door.

The PCBA as illustrated in FIG. 25 features a microprocessor 2502 connected to flash memory 2504 and an Internet of Things Radio communications component 2506. The memory 2504 includes RFID identification numbers for use in identifying RFID tags and authorizing the entry and exit of corresponding RFID tags. The microprocessor is connected to a power supply 2508 which includes a battery module 2510 and DC adapter jack 2512. The microprocessor is also connected to an electric motor 2514 driver (further connected to DC Motor 2516) which drives a Geneva wheel and latch mechanism described in detail above. The memory also includes a schedule or schedules which specify access permissions by time for the RFID tags already stored in the memory. For any known RFID tag at any point in time the access permission may be one of the following four choices: In-Only, Out-Only, No-Access, In-and-Out. A real time clock provides the timing information required to determine access permissions.

The microprocessor reads RFID tags employing the RFID reader electronics 2520 which comprise a tuning circuit 2522, FDXB demodulator 2524 and FDXA demodulator 2526. The microprocessor software utilizes the RFID reader electronics to read RFID tags by generating the RFID field and performing bit detection, framing, error checking, assembly and other functions required to read the various tag types that may be worn by or implanted in a pet.

The microprocessor is connected to sensor board PCBAs 2530 including a motion latch sensor component 2532, a PIR motion detection sensor component 2534, and a Hall Effect Flap sensor 2536. The motion latch sensor component is communicatively coupled with at least one sensor in the frame which monitors position of the exterior and interior latches. The PIR motion detection sensor component (comprising PIR Sensor PN: D203S from MFG: Senba Sensing Technology Co., under one embodiment) cooperates with PIR lens as described above. The Hall Effect Flap sensor component cooperates with a magnet to detect door flap angle as described above.

Figure 26:
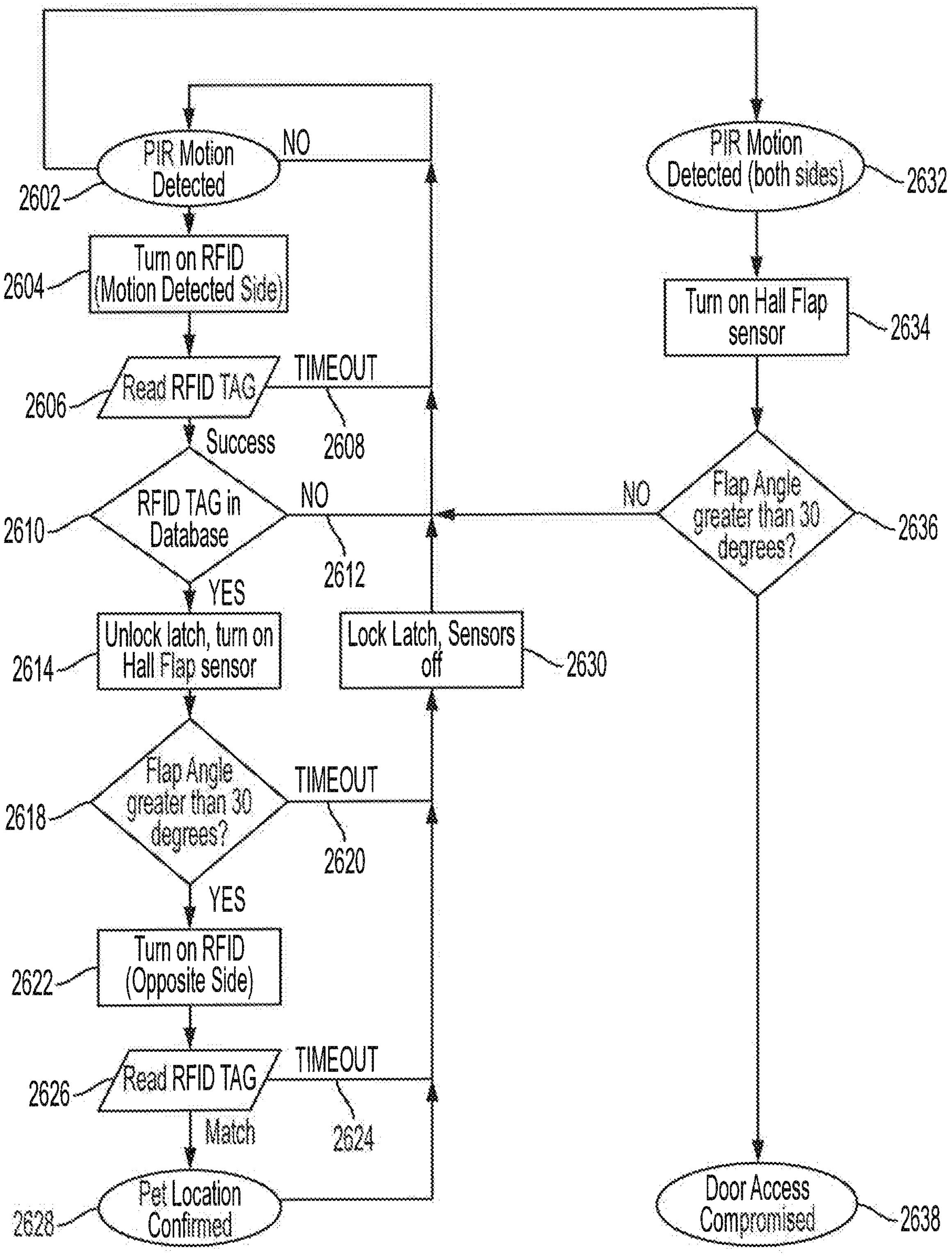
FIG. 26 is a workflow of pet door operation in controlling ingress and egress of a pet.

FIG. 26 provides a workflow implemented by the pet door in authorizing entry or exit of a pet. For purposes of illustrating workflow in operation, assume that that an animal approaches an exterior of the door from the outside. As the animal approaches (wearing a collar or implanted microchip including an RF Tag), PIR motion is detected 2602 by the microprocessor scan of the exterior PIR sensor. The microprocessor activates 2604 exterior RFID antenna and utilizing the RFID reader electronics attempts to read 2606 the RF Tag for an identification number. The read process may timeout 2608 if no identification number is detected thereby returning workflow to low power idle and periodic sensor detection. If the microprocessor receives an identification number, the microprocessor compares 2610 it to authorized numbers stored in memory and any schedule that is associated with it. If the identification number is recognized, the microprocessor directs motor 2614 to unlock the door and allow ingress of the animal (as described in detail above) and activates Hall Effect Flap sensor. If there is no identification number match 2612, workflow returns to low power idle and periodic sensor detection. The Hall Effect Flap sensor measures angle of the door flap relative to the vertical plane. If the Hall Effect Flap sensor determines 2618 that the angle is greater than 30 degrees, the microprocessor activates 2622 the interior RFID antenna and utilizing the RFID reader electronics attempts to read 2626 the RF Tag for an identification number. (If the process times out 2620 the microprocessor locks all door latches and deactivates Hall Effect Flap sensor 2630). If the microprocessor receives the same identification number identified above, the microprocessor recognizes a match thereby confirming 2628 pet location. The microprocessor then activates motor 2630 to lock latches to prevent movement of the flap and deactivates Hall Effect Flap sensor. If the microprocessor (via interior RFID antenna and RFID reader electronics) fails to read a matching identification number for an established period of time, the operation times out 2624, and microprocessor activates motor to lock latches to prevent movement of the flap and deactivates the Hall Effect Flap sensor.

Under an embodiment, if PIR motion is detected 2632 on both sides of the door, the microprocessor alternates attempting to read RFID tags using the inside and outside antennas. If a matching RFID tag is identified with a schedule that grants access at the time, the latches are set to the position permitting the pet to transit through the door. If no RFID tag is read or the schedule does not permit access at the time the pet is present the latches remain locked. In addition to periodically scanning for motion the microprocessor periodically activates 2634 the flap sensor and checks for it to be in the centered position. A detected flap angle greater than 30 degrees 2636 indicates that door access is compromised 2638.

An embodiment of the pet door may implement a mode entitled "Pet Location Tracking In Flap Mode". The location of a pet may be tracked by using the motion sensors to detect when a pet approaches and transits through the door while the inside latches and outside latches are both disengaged causing the door's flap to free swing in either direction. A pet approaching the door from inside is detected by the inside motion sensor, and the RFID reader identifies the pet as inside by reading the RFID tag using the inside antenna. A subsequent flap motion event whereby the flap is detected as swinging outward indicates that the pet has exited the home which is then confirmed by reading the RFID tag using the outside antenna. The reverse operation also applies, whereby a pet outside the door enters the home with the latches disengaged.

An embodiment of the pet door may implement a mode entitled "One Way Flap Mode With Schedule". Combining a schedule with the ability to limit access into the home or out of the home by setting the latches into in-only or out-only position may be used to provide a "One-Way Flap Mode". For example, in this mode the latches may permit pets to only exit the home in the morning by setting the latches to out-only. In the evening, to assure the pets were secure and inside the latches may be set to in-only permitting the pets to enter the home but not exit again. Employing the RFID reader, motions sensors, and flap sensor (operating as described in the mode above) permits the pet owner to identify which pets have not yet returned home at the end of the day.

Preventing Both Egress from and Ingress into the Home.

To prevent egress from the home or ingress into the home the interior latches 114 and exterior latches 134 are maintained in an up or locked position by the microprocessor 87, as shown in FIGS. 1A, 1B, 3, 7, 8, 10, 14, and 15. In this condition or position, the interior latches 114 have their cam followers 116 riding upon a low rise portion 106 or 108 of the interior latch cams 102. This positions the interior latch catches 118 in a raised position wherein the end tangs 119 are positioned within the flap locking pocket 59 and in locking engagement with the pocket side walls 57, thereby engaging the flap 16 to prevent the flap 16 from pivoting into the home.

Similarly, the exterior latches 134 have their cam followers 136 riding upon a low-rise portion 106 or 108 of the exterior latch cams 100. This positions the exterior latch catches 138 in a raised position wherein the end tangs 139 are positioned within the flap locking pocket 59 and in locking engagement with the pocket side walls 57, thereby engaging the flap 16 to prevent the flap 16 from pivoting away from the home. With the interior latches 114 and exterior latches 134 in this up position, the flap cannot pivot into or out of the home, thus preventing an animal from both entering or leaving the home.

Allowing Controlled Egress Out of the Home.

Figure 12:
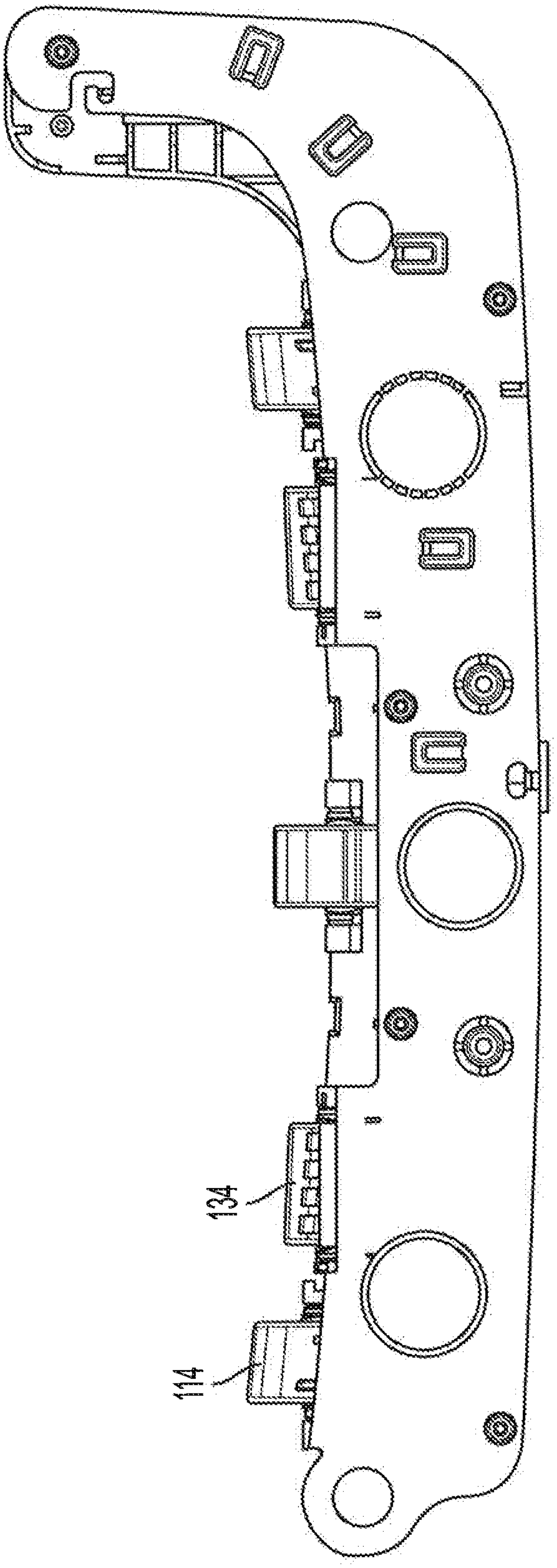
FIG. 12 is a rear view of the locking mechanism of the pet door of FIG. 1A, showing the interior latches in a locked position and the exterior latches in an unlocked position.
Figure 13:
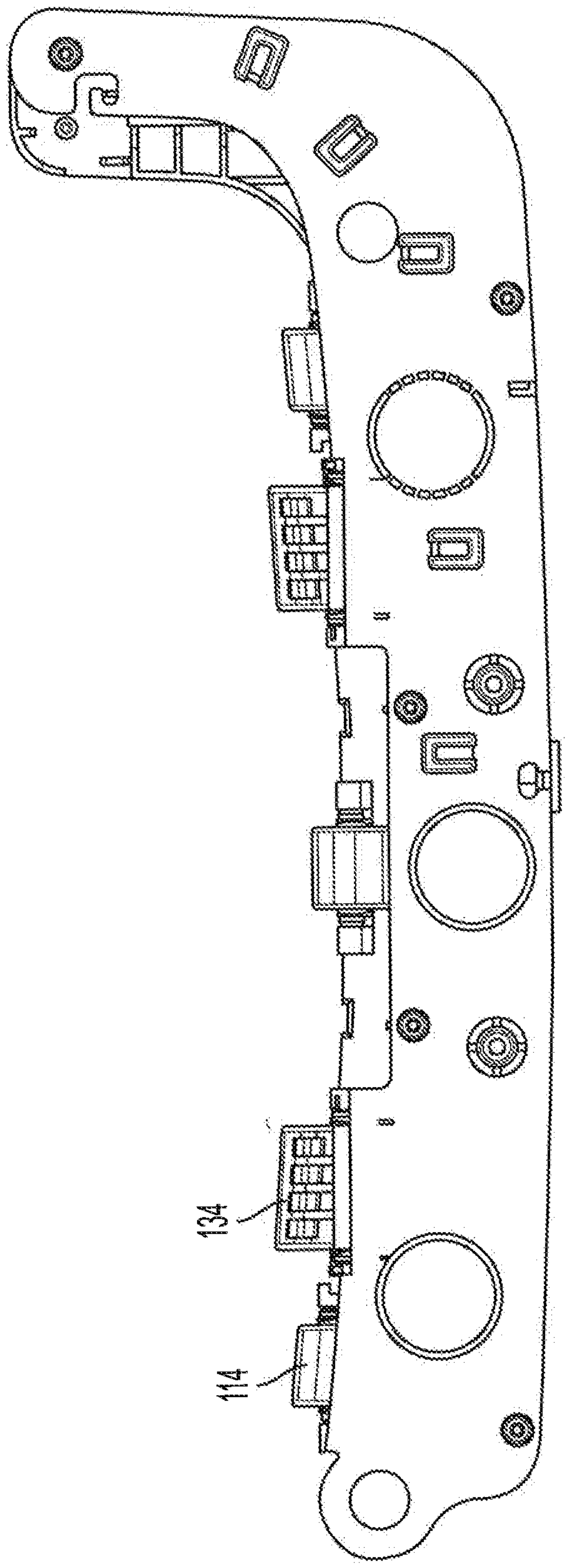
FIG. 13 is a rear view of the locking mechanism of the pet door of FIG. 1A, showing the interior latches in an unlocked position and the exterior latches in a locked position.
Figure 14:
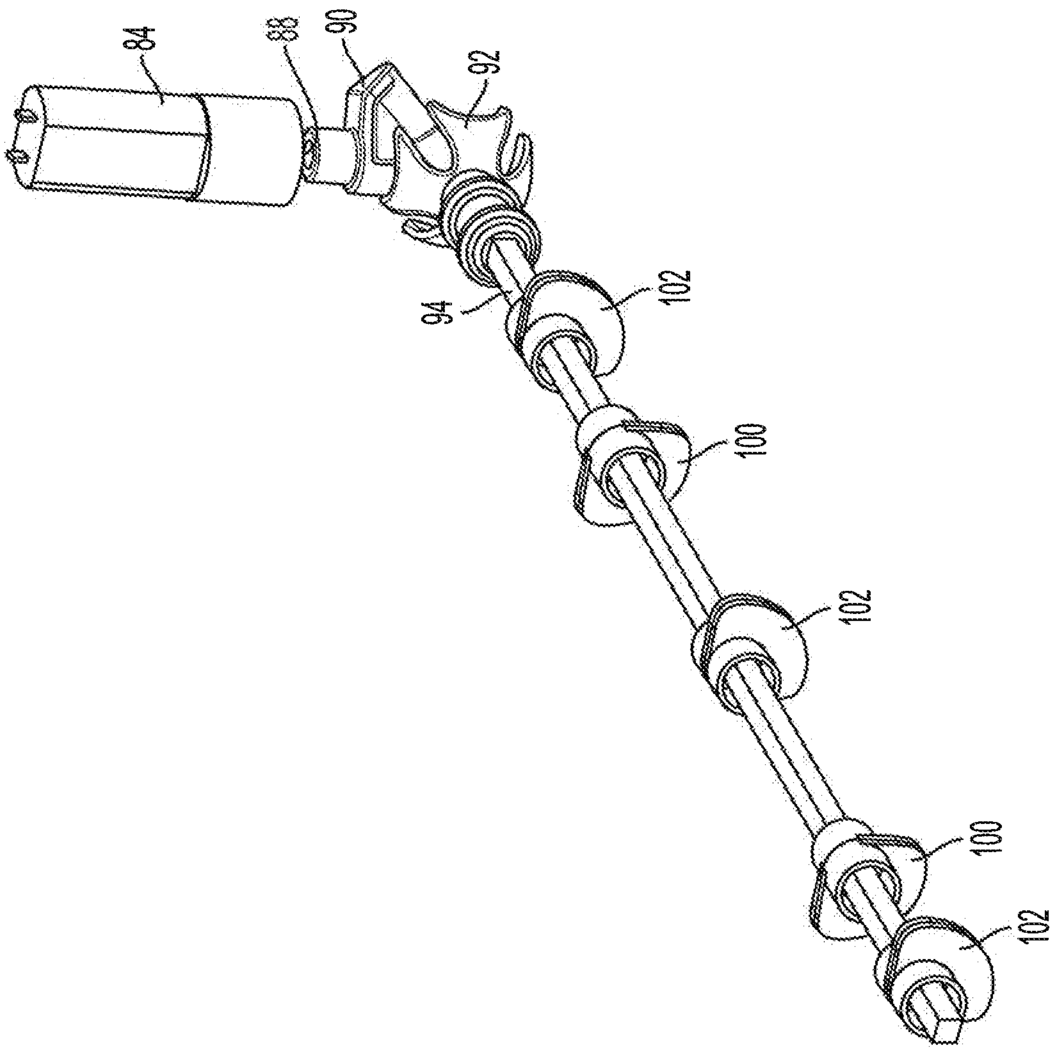
FIG. 14 is a perspective view of the camming system of the pet door of FIG. 1A.
Figure 15:
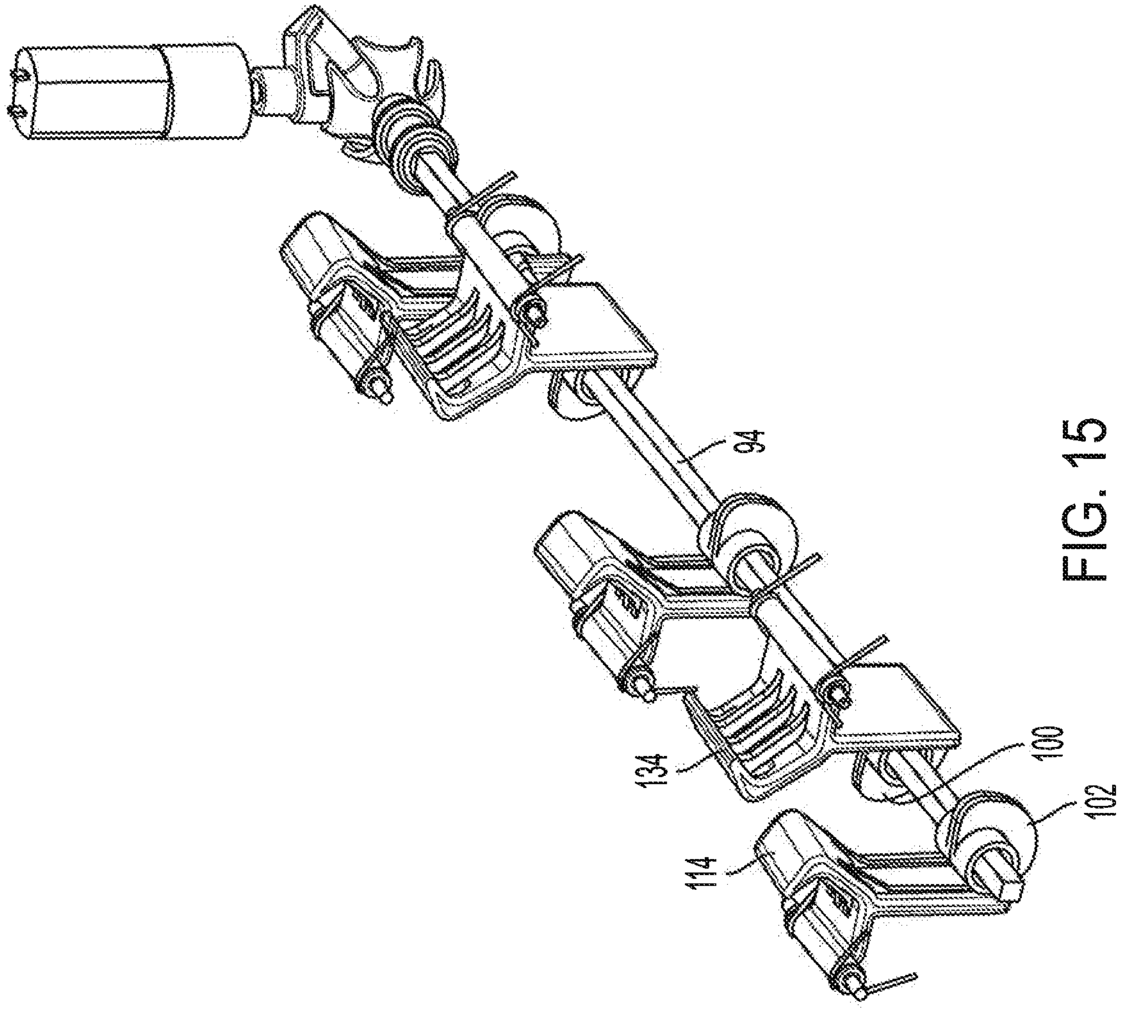
FIG. 15 is a perspective view of the camming system of the pet door of FIG. 1A, showing the interior latches in a locked position and the exterior latches in a locked position.
Figure 17:
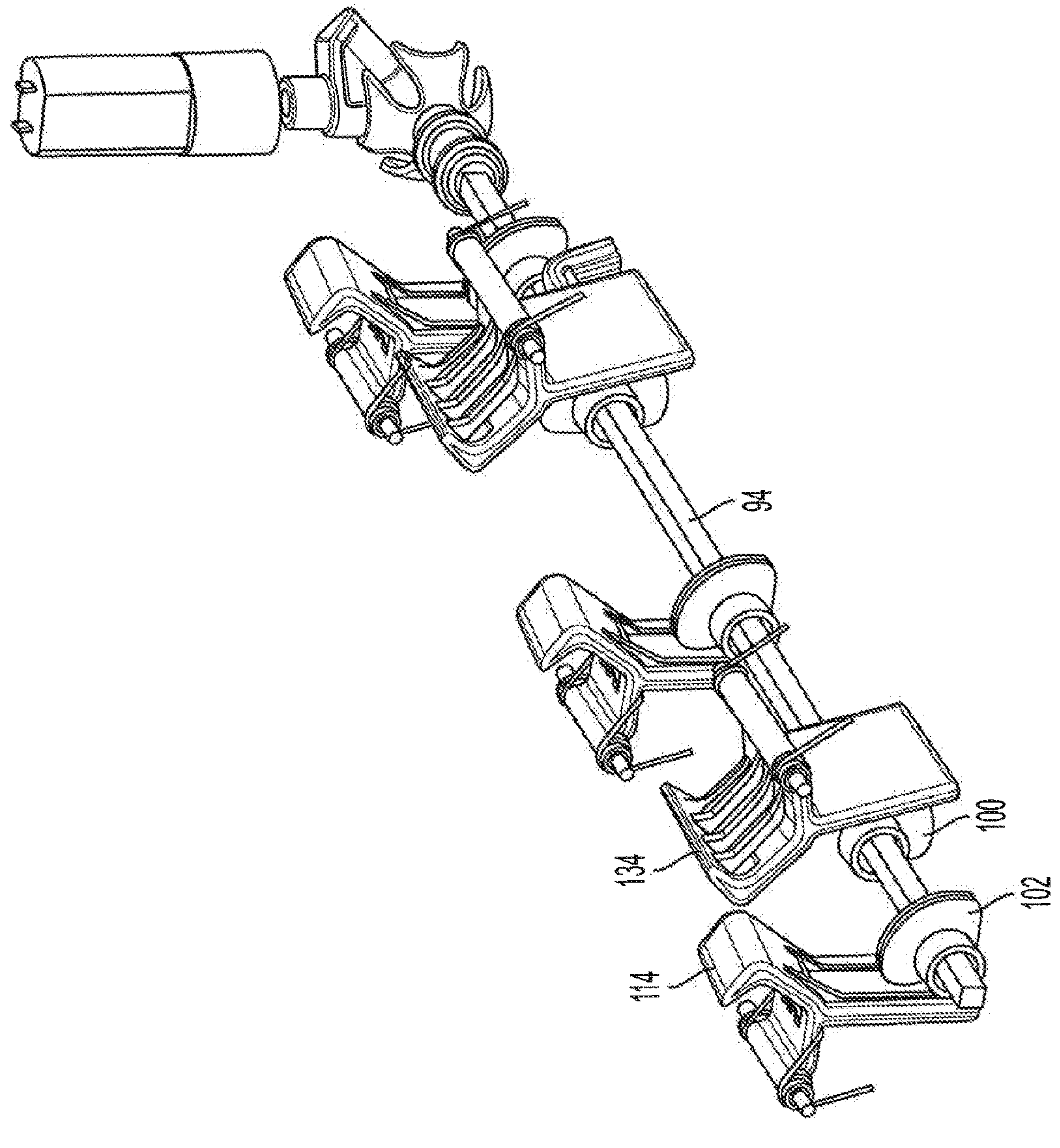
FIG. 17 is a perspective view of the camming system of the pet door of FIG. 1A, showing the interior latches in a locked position and the exterior latches in an unlocked position.
Figure 18:
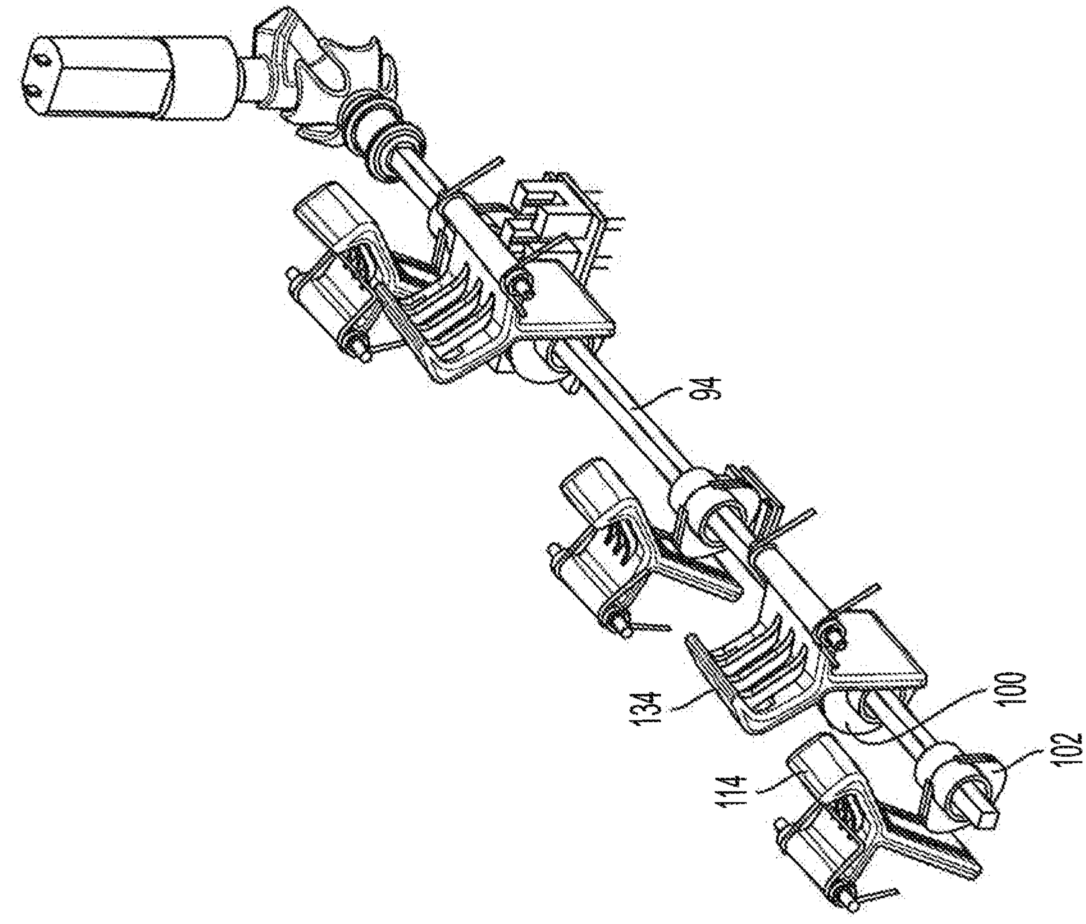
FIG. 18 is a perspective view of the camming system of the pet door of FIG. 1A, showing the interior latches in an unlocked position and the exterior latches in a locked position.
Figure 19:
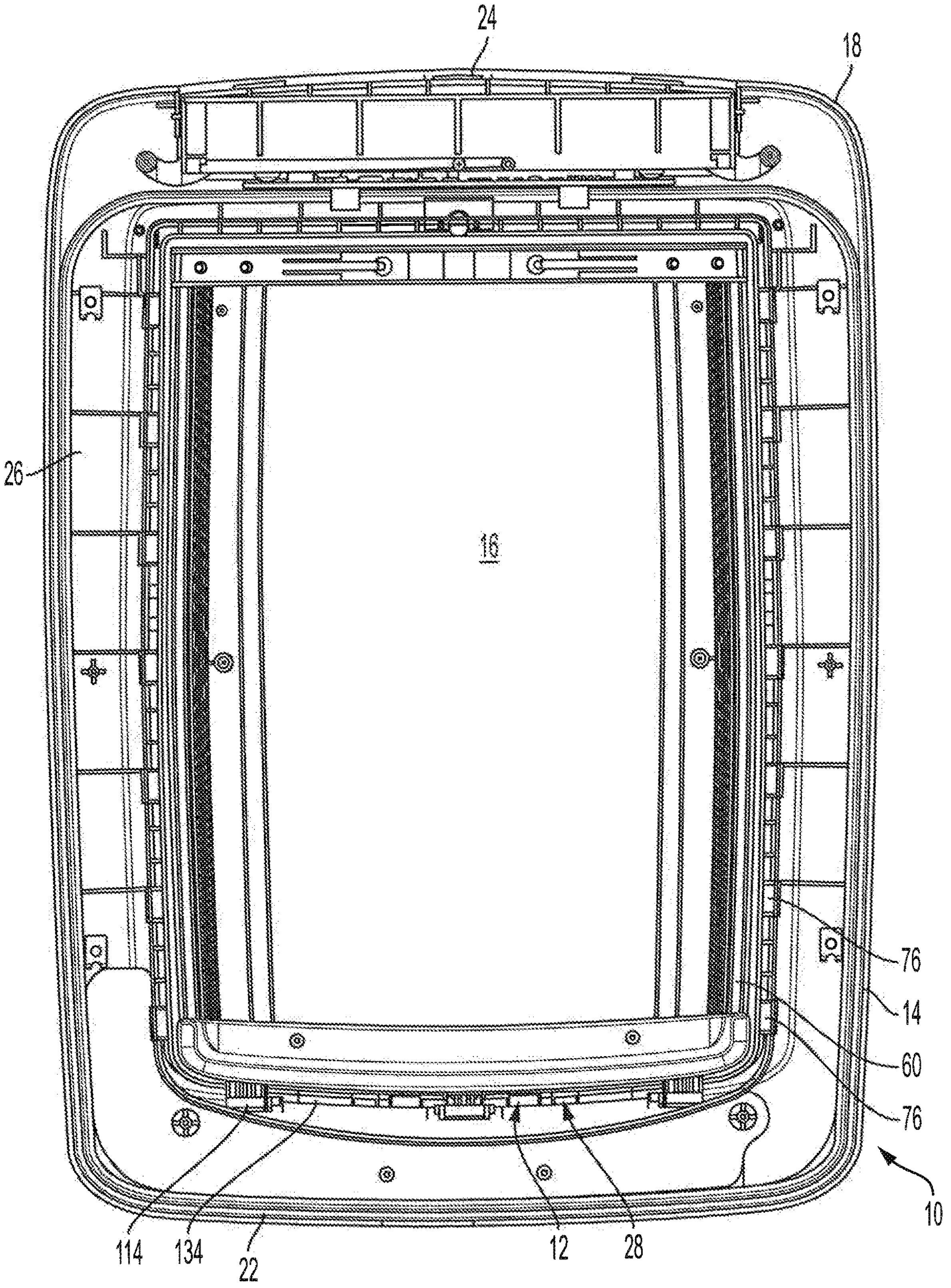
FIG. 19 is a front view of a rear portion of the pet door of FIG. 1A.

For allowing the automatic exiting or egress of an animal from the inside the home to outside the home, the interior PIR sensor senses the approaching of an animal. If the interior RFID reader does not detect and the microprocessor does not authenticate an RFID Tag identification number, the microprocessor maintains the flap's locked position of both the exterior latches 134 and interior latches 114 to prevent the pivoting of the flap 16 in either direction, as shown in FIGS. 1A, 1B, 3, 7, 8, 10, 14, and 15. However, should the RFID Tag identification correspond to an approved RFID identification, the controller 87 initiates movement of the exterior latches 134 to an open, down or unlocked position to allow outward pivoting of the flap 16, as shown in FIGS. 12 and 17.

To move the exterior latches 134 to their open position, the microprocessor 87 energizes the electric motor 84, which in turn causes the rotation of the motor drive shaft 88 and Geneva pin 90 coupled thereto. The complete rotation of the Geneva pin 90 causes the incremental rotation, of approximately 90 degrees of the Geneva wheel 92 and associated cam drive shaft 94 to a position relating to an unlocked exterior latch 134 position, best shown in FIGS. 12 and 17. The unlocked position of the exterior latch 134 is sensed by the cam position sensor which then relays a signal to the controller 87.

The rotation of the drive shaft 94 causes the rotation of the exterior latch cams 100 to ride upon the exterior latch cam followers 136. As the exterior latch cam's high-rise portions 110 ride upon the exterior latch cam followers 136, the mounting bosses 142 of the exterior latches 134 pivot about pivot pins 144, thereby causing the exterior latch catches 138 to move downwardly. This downward movement of the exterior latch catches 138 removes the catch end tangs 139 from the flap's bottom locking pocket 59 so to allow outward pivoting of the flap 16. The animal may then exit the home by passing through the partially unlocked pet door 10 by pivoting the flap 16 outwardly.

Once the exterior latches 134 are moved downwardly, the microcontroller 87 waits for a signal from the Hall Effect Flap sensor. If the Hall Effect Flap sensor indicates that the flap 16 has not pivoted more than the minimally accepted 30 degrees within an established period of time, the microprocessor initiates the locking of the exterior latches 134 so as to relock the flap 16 by again activating the electric motor 84 to rotate the drive shaft 88, Geneva pin 90, Geneva wheel 92, drive shaft 94 and exterior latches 134. This prevents a registered pet from unlocking the pet door 10, then if not passing through the pet door 10 allowing the pet door 10 to remain unlocked.

On the other hand, if the Hall Effect Flap sensor indicates that the flap 16 has pivoted more than the required 30 degrees within an established period of time, the microprocessor energizes the exterior RFID reader. If the exterior RFID reader does not detect and the microprocessor does not authenticate the RFID identification number within a period of time, the microcontroller initiates the locking of the exterior latches 134 so as to relock the flap 16, as previously described. If the exterior RFID reader detects and the microprocessor authenticates the RFID identification number within a period of time, the microprocessor then similarly initiates the locking of the exterior latches 114 so as to relock the flap 16, as previously described. At this moment, the location of the pet is confirmed.

The microprocessor 87 initiates the locking of the exterior latches 134 by actuating the motor 84 to rotate the motor drive shaft 88 and Geneva pin 90, thereby again engaging the Geneva wheel 92 to incrementally rotate drive shaft 94. The rotation of the drive shaft 94 causes the exterior latch cam followers 136 to ride off the exterior latch cam's high-rise portions 110 and onto a low-rise portion 106 or 108. The biasing force of torsion springs 146 causes the return or pivoting of the exterior latches 134 to a position wherein the end tangs 139 of the catches 138 are repositioned into and lockably engaging the bottom locking pocket 59.

It should be understood that the interior latches 114 remain in their locked position as the interior latch cam followers 116 ride upon the low-rise portion 106 or 108 of the interior latch cams 102.

Allowing Controlled Ingress into the Home.

For allowing the automatic entry or ingress of an animal from the outside into the inside of the home, the exterior PIR sensor senses the approaching of an animal. If the exterior RFID reader does not detect and the microprocessor does not authenticate an RFID Tag identification number, the microprocessor maintains the flap's locked positions of the interior latches 114 and exterior latches 134 to prevent the pivoting of the flap 16 in either direction, as shown in FIGS. 1A, 1B, 2, 3, 6, 7, 8, 10, 14, and 15. However, should the RFID reader identification correspond to an approved RFID Tag identification, the microprocessor initiates movement of the interior latches 114 to an open or down position to allow inward pivoting of the flap 16, as shown in FIGS. 4, 9, 13, and 18.

To move the interior latches 114 to their open position, the microprocessor 87 energizes the electric motor 84, which in turn causes the rotation of the motor drive shaft 88 and Geneva pin 90 coupled thereto. The complete rotation of the Geneva pin 90 causes the incremental rotation, of approximately 90 degrees of the Geneva wheel 92 and associated cam drive shaft 94 to a position relating to an unlocked interior latch 114 position, best shown in FIGS. 4, 9 and 18. The unlocked position of the interior latch 114 is sensed by the cam position sensor which then relays a signal to the microprocessor 87.

The rotation of the drive shaft 94 causes the rotation of the interior latch cams 102 to ride upon the interior latch cam followers 116. As the interior latch cam's high-rise portions 110 ride upon the interior latch cam followers 116, the mounting bosses 122 of the interior latches 114 pivot about pivot pins 124, thereby causing the interior latch catches 118 to move downwardly. This downward movement of the interior latch catches 118 removes the catch end tangs 119 from the flap's bottom locking pocket 59 so to allow inward pivoting of the flap 16. The animal may then enter the home by passing through the partially unlocked pet door 10 by pivoting the flap 16 inwardly.

Once the interior latches 114 are moved downwardly, the microprocessor waits for a signal from the Hall Effect Flap sensor. If the Hall Effect Flap sensor indicates that the flap 16 has not pivoted more than the minimally accepted 30 degrees within an established period of time, the microprocessor initiates the locking of the interior latches 114 so as to relock the flap 16 by again activating the electric motor 84 to rotate the drive shaft 88, Geneva pin 90, Geneva wheel 92, drive shaft 94 and interior latches 114. This prevents a registered pet from unlocking the pet door 10, then if not passing through the pet door 10 allowing the pet door 10 to remain unlocked.

On the other hand, if the Hall Effect Flap sensor indicates that the flap 16 has pivoted more than the required 30 degrees within an established period of time, the microprocessor energizes the interior RFID reader. If the interior RFID reader does not detect and the microprocessor does not authenticate an RFID tag identification number within an established period of time, the microprocessor initiates the locking of the interior latches 114 so as to relock the flap 16, as previously described. If the interior RFID reader detects and the microprocessor authenticates an RFID tag identification number, the microcontroller then similarly initiates the locking of the interior latches 114 so as to relock the flap 16, as previously described. At this moment, the location of the pet is confirmed.

The microcontroller initiates the locking of the interior latches 114 by actuating the motor 84 to rotate the motor drive shaft 88 and Geneva pin 90, thereby again engaging the Geneva wheel 92 to incrementally rotate drive shaft 94. The rotation of the drive shaft 94 causes the interior latch cam followers 116 to ride off the interior latch cam's high-rise portions 110 and onto a low-rise portion 106 or 108. The biasing force of torsion spring 126 causes the return or pivoting of the interior latches 114 to a position wherein the end tangs 119 of the catches 118 are repositioned into and lockably engaging the bottom locking pocket 59.

As an option, the pet door 10 may include manual push buttons 150 which cyclically actuate the electric motor to cycle through the multiple positions of the interior and exterior latches. This option allows a person to control the locking and unlocking of the pet door 10 without the need of the pet or the electronics associated with the pet collar. The position of the latches or present condition of the door (locked/unlocked) are indicated upon display lights/symbols 150'.

It should be understood that the exterior latches 134 remain in their locked position as the exterior latch cam followers 136 ride upon the low-rise portion 106 or 108 of the exterior latch cams 100.

Allowing Manually Controlled Egress from and Ingress into the Home.

Figure 11:
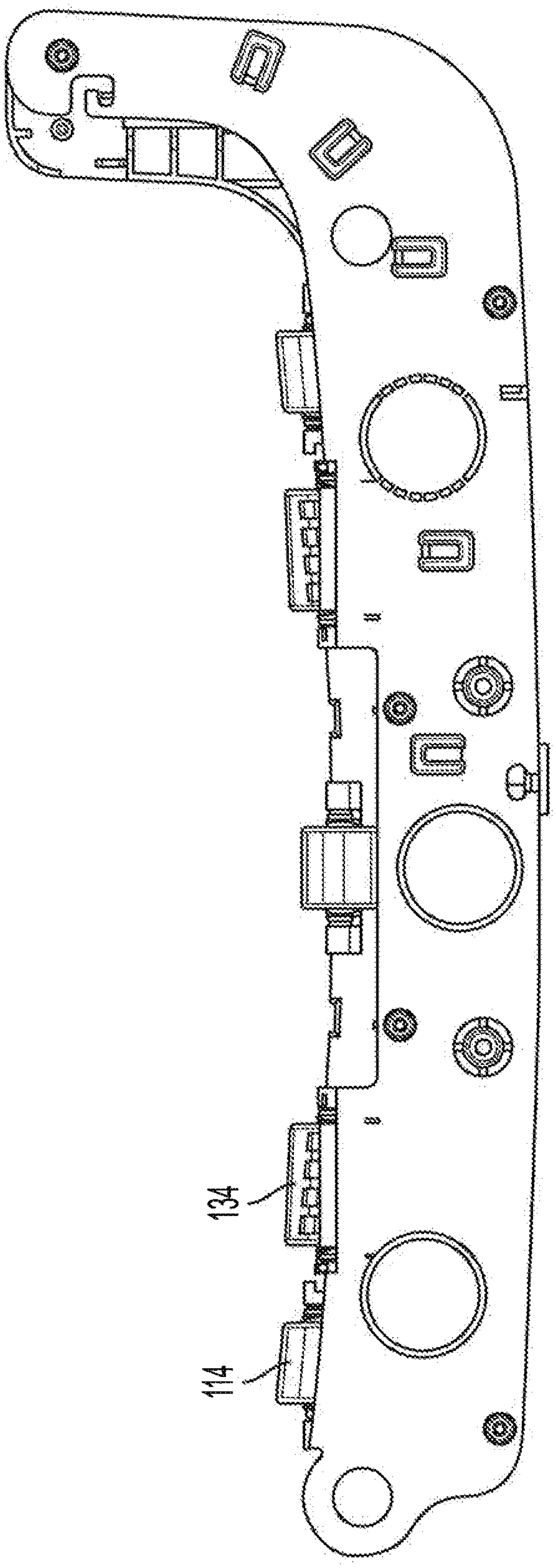
FIG. 11 is a rear view of the locking mechanism of the pet door of FIG. 1A, showing the interior latches in an unlocked position and the exterior latches in an unlocked position.
Figure 16:
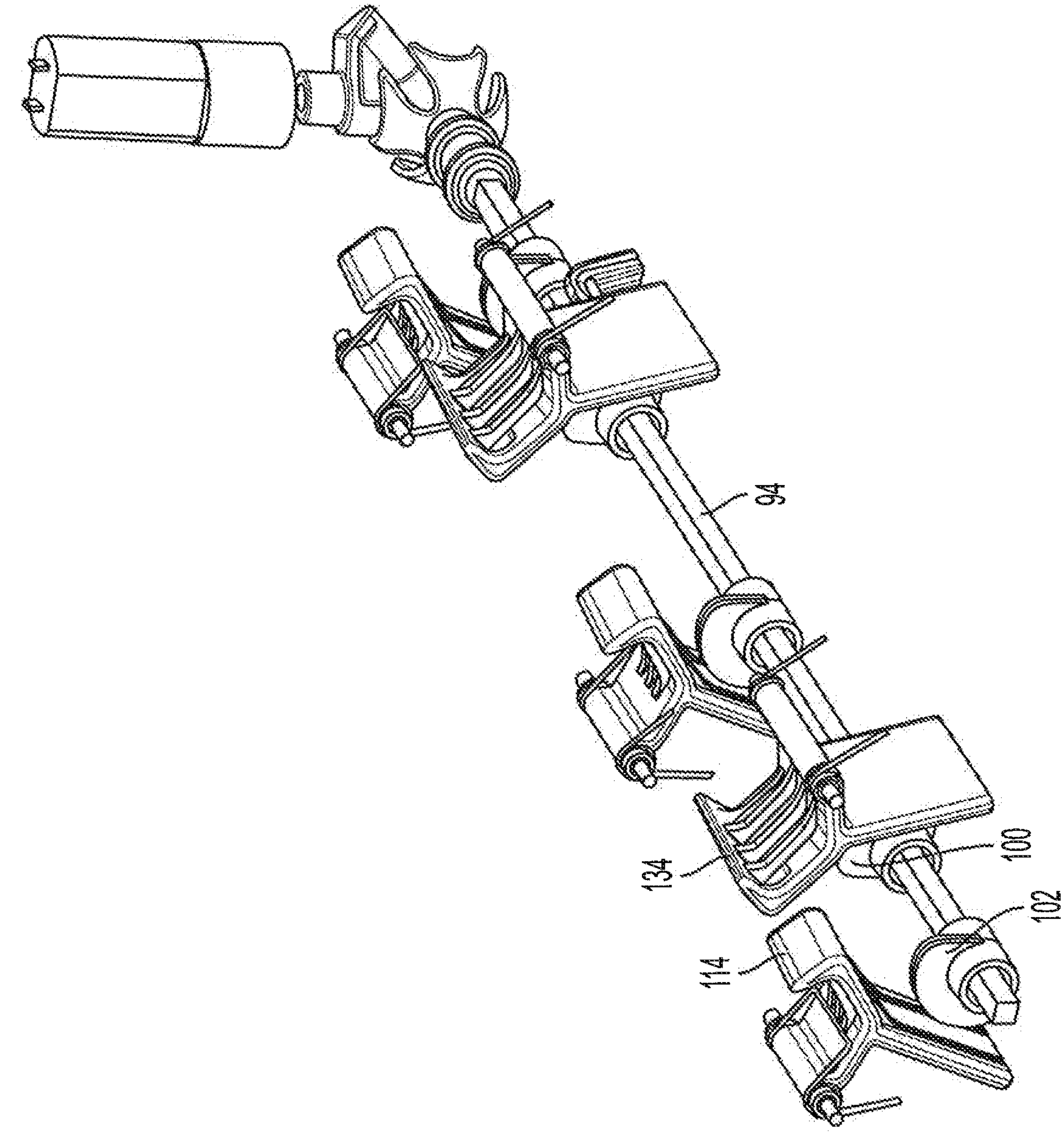
FIG. 16 is a perspective view of the camming system of the pet door of FIG. 1A, showing the interior latches in an unlocked position and the exterior latches in an unlocked position.

A manual push button 150 may be actuated to allow egress from the home or ingress into the home as the interior latches 114 and exterior latches 134 are maintained in a down or unlocked position, as shown in FIGS. 11 and 16. In this condition or position, the interior latches 114 have their cam followers 116 riding upon the high rise portions 110 of the interior latch cams 102. This positions the interior latch catches 118 in a lowered position wherein the end tangs 118 are positioned below the flap locking pocket 59 thereby dis-engaging the flap 16 to allow the flap 16 to pivot into the home.

Similarly, the exterior latches 134 have their cam followers 136 riding upon a high-rise portions 110 of the exterior latch cams 100. This positions the exterior latch catches 138 in a lowered position wherein the end tangs 138 are positioned below the flap locking pocket 59 thereby dis-engaging the flap 16 to allow the flap 16 to pivot away from the home.

With the interior latches 114 and exterior latches 134 in this down or unlocked position, the flap 16 can pivot into or out of the home, thus allowing an animal both entry into and exit from the home.

It should be understood that all incremental positions of the internal latches 114 and exterior latches 134 are sensed by a cam positioning sensor.

It will be appreciated that the embodiments described herein are susceptible to modification, variation and change without departing from the spirit thereof.

A pet door is described herein comprising a first motion detector, a second motion detector, a first radio-frequency identification (RFID) reader, a second RFID reader, a flap sensor, at least one processor, and a memory. The pet door includes one or more applications configured to run on the at least one processor, wherein the one or more applications are communicatively coupled with the first motion detector, the second motion detector, the first RFID reader, the second RFID reader, the flap sensor, and the memory. The pet door includes a motor for locking and unlocking a pet flap of the pet door, wherein the pet flap is rotatably attached to an upper portion of the pet door, wherein the one or more applications are communicatively coupled with the motor. The pet door includes the first motion detector for monitoring movement in a first detection region. The pet door includes the second motion detector for monitoring movement in a second detection region, wherein the pet flap of the pet door occupies a plane separating the first detection region from the second detection region when the pet flap is in a locked position. The pet door includes the one or more applications configured to receive a first motion signal from the first motion detector indicating movement of a pet in the first detection region, the receiving the first motion signal including activating an access sequence, the access sequence including activating the first RFID reader to read an RFID tag attached to the pet, authenticating the RFID number extracted from the RFID tag in a first authentication process, instructing the motor to unlock the pet flap after successful completion of the first authentication process, wherein the unlocked pet flap allows passage of the pet from the first detection region to the second detection region, activating the flap sensor for monitoring a first angle of the pet flap relative to the plane, activating the second RFID reader to read the RFID tag attached to the pet when the monitored first angle is greater than a threshold degree value relative to the plane, authenticating the RFID number extracted from the RFID tag in a second authentication process, and instructing the motor to lock the pet flap after successful completion of the second authentication process.

The flap sensor includes a magnet, under an embodiment.

The magnet comprises a fixed position relative to the pet flap, under an embodiment.

The flap sensor includes a Hall Effect sensor, under an embodiment.

The Hall Effect sensor detects a magnetic field of the magnet, under an embodiment.

The Hall Effect sensor uses information of the magnetic field and the known fixed position of the magnet to determine the flap angle, under an embodiment.

The first RFID reader comprises a first antenna coil, under an embodiment.

The second RFID reader comprises a second antenna coil, under an embodiment.

The first antenna coil is disposed around a tunnel component that surrounds the pet flap and extends outwardly from a frame of the pet door, under an embodiment.

The tunnel component is oriented either in a direction of the first detection region or the second detection region, under an embodiment.

The second antenna is disposed around an interior periphery of the frame positioned opposite the tunnel component, under an embodiment.

The first motion detector comprises a passive infrared sensor component, under an embodiment.

The second motion detector comprises a passive infrared sensor component, under an embodiment.

The one or more applications terminate the access sequence when the first authentication process fails, under an embodiment.

The one or more applications terminate the access sequence when the second authentication process fails, under an embodiment.

The one or more applications instruct the motor to lock the pet flap upon failure of the second authentication process, under an embodiment.

The one or more applications instruct the motor to lock the pet flap upon successful completion of the access sequence, under an embodiment.

The first authentication process comprises confirming the presence of the RFID number in the memory, under an embodiment.

The first authentication process includes determining an access permission associated with the RFID number, under an embodiment.

The access permission associates a permitted time of access with the RFID number, under an embodiment.

The first authentication process fails when an instant time of the first authentication process is outside the permitted time, under an embodiment.

The second authentication process comprises confirming the presence of the RFID number in the memory, under an embodiment.

A pet door is described herein comprising a frame defining a passageway therethrough, the frame having a first magnetic portion positioned closely adjacent the passageway, a flap pivotally coupled to the frame for movement between a closed position adjacent the frame and an open position away from the frame, the flap having a peripheral edge at least partially defining the flap, a movable seal coupled to the peripheral edge of the flap for reciprocal movement between a retracted position proximal the flap peripheral edge and an extended position distal the flap peripheral edge, the seal having a second magnetic portion that is magnetically attracted to the first magnetic portion of the frame, the seal being movable to the retracted position when the door is pivoted to its open position and the seal being magnetically moved to its extended position through the magnetic attraction between the first and second magnetic portions when the door is in its closed position.

The seal includes a compressible portion that biases the second magnetic portion towards its retracted position. The compressible portion is tubular.

The seal may include a mounting flange, a compressible portion extending from the mounting flange that biases the second magnetic portion towards its retracted position, and a holder portion extending from the compressible portion retaining the second magnetic portion.

The flap peripheral edge includes an inwardly extending channel, wherein the second magnetic portion of the movable seal is positioned within the channel when the seal is in its retracted position and the movable seal is positioned at least partially outside the channel when the seal is in its extended position.

The first magnetic portion may be a magnet and the second magnetic portion may be ferrous material, or visa-versa.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

What is claimed is:

1. A pet door, comprising:

a frame defining a passageway therethrough, the frame having a first magnetic portion positioned closely adjacent the passageway;

a flap pivotally coupled to the frame for movement between a closed position adjacent the frame and an open position away from the frame, the flap having a peripheral edge at least partially defining the flap;

a movable seal coupled to the peripheral edge of the flap for reciprocal movement between a retracted position proximal the peripheral edge and an extended position distal the peripheral edge, the movable seal having a second magnetic portion that is magnetically attracted to the first magnetic portion of the frame, the movable seal being movable to the retracted position when the door is pivoted to its open position and the movable seal is magnetically moved to its extended position through the magnetic attraction between the first and second magnetic portions when the door is in its closed position, wherein the movable seal includes a mounting flange, a compressible portion extending from the mounting flange that biases the second magnetic portion towards its retracted position, and a holder portion extending from the compressible portion retaining the second magnetic portion.

2. The pet door of claim 1, wherein the movable seal includes a compressible portion that biases the second magnetic portion towards its retracted position.

3. The pet door of claim 2, wherein the compressible portion is tubular.

4. The pet door of claim 1 wherein the peripheral edge includes an inwardly extending channel, and wherein the second magnetic portion of the movable seal is positioned within the channel when the movable seal is in its retracted position and the movable seal is positioned at least partially outside the channel when the movable seal is in its extended position.

5. The pet door of claim 1, wherein the first magnetic portion is a magnet and the second magnetic portion is ferrous material.

6. A pet door, comprising:

a frame defining a passageway therethrough, the frame having a first magnetic portion positioned closely adjacent the passageway;

a flap pivotally coupled to the frame, the flap having at least one peripheral edge;

a movable seal coupled to the flap for reciprocal movement between a retracted position and an extended position, the movable seal having a second magnetic portion that is magnetically attracted to the first magnetic portion of the frame, whereby the movable seal is biased to the retracted position when the door is open and the movable seal being magnetically biased to the extended position by the magnetic force between the first and second magnetic portions when the door is closed, wherein the movable seal includes a mounting flange, a compressible portion extending from the mounting flange that biases the second magnetic portion towards its retracted position, and a holder portion extending from the compressible portion retaining the second magnetic portion.

7. The pet door of claim 6, wherein the movable seal includes a compressible portion that biases the second magnetic portion towards its retracted position.

8. The pet door of claim 7, wherein the compressible portion is tubular.

9. The pet door of claim 6 wherein the flap at least one peripheral edge includes an inwardly extending channel, and wherein the second magnetic portion of the movable seal is positioned within the channel when the movable seal is in its retracted position and the movable seal is positioned at least partially outside the channel when the movable seal is in its extended position.

10. The pet door of claim 6, wherein the first magnetic portion is a magnet and the second magnetic portion is ferrous material.

11. A pet door, comprising:

a frame defining a passageway therethrough, the frame having a first magnetic portion;

a flap pivotally coupled to the frame;

a seal coupled to the flap for reciprocal movement between a first position adjacent the flap and a second position distal the flap, the seal having a second magnetic portion that is magnetically attracted to the first magnetic portion of the frame to bias the seal to the second position, whereby the seal is biased to the first position when the door is open and the seal is magnetically biased to the second position by the magnetic force between the first and second magnetic portions when the door is closed so as to create a seal between the flap and frame, wherein the seal includes a mounting flange, a compressible portion extending from the mounting flange that biases the second magnetic portion towards its first position, and a holder portion extending from the compressible portion retaining the second magnetic portion.

12. The pet door of claim 11, wherein the seal includes a compressible portion that biases the second magnetic portion towards its first position.

13. The pet door of claim 12, wherein the compressible portion is tubular.

14. The pet door of claim 11 wherein the flap at least one peripheral edge includes an inwardly extending channel, and wherein the second magnetic portion of the seal is positioned within the channel when the seal is in its first position and the seal is positioned at least partially outside the channel when the seal is in its second position.

15. The pet door of claim 11, wherein the first magnetic portion is a magnet and the second magnetic portion is ferrous material.

* * * * *